(12) United States Patent
Kim et al.

(10) Patent No.: US 12,366,771 B2
(45) Date of Patent: Jul. 22, 2025

(54) DISPLAY DEVICE

(71) Applicant: LG ELECTRONICS INC., Seoul (KR)

(72) Inventors: Seho Kim, Seoul (KR); Kuenyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/666,383

(22) Filed: May 16, 2024

(65) Prior Publication Data

US 2025/0004311 A1   Jan. 2, 2025

(30) Foreign Application Priority Data

Jun. 30, 2023 (KR) .................. 10-2023-0085215

(51) Int. Cl.
*G02F 1/1333* (2006.01)
*G02F 1/1335* (2006.01)
*G02F 1/13357* (2006.01)

(52) U.S. Cl.
CPC .. *G02F 1/133308* (2013.01); *G02F 1/133601* (2021.01); *G02F 1/133603* (2013.01); *G02F 1/133605* (2013.01)

(58) Field of Classification Search
CPC ......... G02F 1/133308; G02F 1/133605; G02F 1/133603; G02F 1/133601; G02F 1/133311; G02F 1/133612
See application file for complete search history.

(56) References Cited

U.S. PATENT DOCUMENTS

| 10,330,283 | B2* | 6/2019 | Woodgate | H01L 22/20 |
| 2010/0109562 | A1* | 5/2010 | Shen | G02F 1/133603 |
| | | | | 315/294 |
| 2018/0233094 | A1 | 8/2018 | Kumamoto et al. | |
| 2020/0051958 | A1* | 2/2020 | Hu | H01L 27/1214 |
| 2021/0003891 | A1* | 1/2021 | Seo | G02F 1/133605 |
| 2021/0165280 | A1* | 6/2021 | Lee | G02F 1/133603 |
| 2022/0066267 | A1* | 3/2022 | Nakabayashi | G02F 1/133612 |
| 2023/0085463 | A1 | 3/2023 | Nakabayashi et al. | |

FOREIGN PATENT DOCUMENTS

| KR | 10-2022-0139269 A | 10/2022 |
| KR | 10-2023-0003942 A | 1/2023 |
| WO | WO 2008/023893 A1 | 2/2008 |

* cited by examiner

*Primary Examiner* — Zheng Song
(74) *Attorney, Agent, or Firm* — Birch, Stewart, Kolasch & Birch, LLP

(57) ABSTRACT

A display device including a display panel; a frame positioned behind the display panel; a substrate positioned between the display panel and the frame, and coupled to the frame; a plurality of light sources arranged in a matrix including aligned rows and columns of light sources on a front surface of the substrate; and a diode positioned on the front surface of the substrate to be offset from a corresponding column and a corresponding row of the light sources.

18 Claims, 31 Drawing Sheets

DISPLAY DEVICE

CROSS-REFERENCE TO RELATED APPLICATION

This application claims priority to Korean Patent Application No. 10-2023-0085215, filed in the Republic of Korea on Jun. 30, 2023, the entire contents of which are hereby expressly incorporated by reference into the present application.

BACKGROUND OF THE INVENTION

Field of the Invention

The present disclosure relates to a display device.

Description of the Related Art

Various display devices, such as a liquid crystal display (LCD), a plasma display panel (PDP), an electro luminescent display (ELD), a vacuum fluorescent display (VFD), an organic light emitting diode (OLED), and the like, have been developed and used. Among them, an LCD panel includes a TFT substrate and a color substrate that are disposed opposite of each other with a liquid crystal layer interposed therebetween to thereby display an image using light provided from a backlight unit.

Recently, research on a structure of a substrate on which a light source such as an LED is mounted has been performed. In addition, research has been conducted for improving the picture quality of images displayed by a display panel.

SUMMARY OF THE INVENTION

Accordingly, one object of the present disclosure is to solve the above and other problems.

Another object of the present disclosure is to provide a display device having a single sided PCB as a substrate on which light sources are mounted.

Another object of the present disclosure is to provide a structure that improves the picture quality by minimizing intrusion in the light coverage of light sources on a substrate by a protruding element on the substrate.

Still another object of the present disclosure is to provide various examples of the placement of a protruding element between light sources.

Yet another object of the present disclosure is to provide a structure that minimizes a reflective sheet, which covers a substrate, from being lifted by a protruding element on a substrate.

Another object of the present disclosure is to provide various examples of a structure for allowing a reflective sheet on a protruding element to be adjacent to a substrate.

In accordance with an aspect of the present disclosure for achieving the above and other objectives, a display device includes a display panel; a frame positioned behind the display panel; a substrate positioned between the display panel and the frame, and coupled to the frame; a plurality of light sources arranged on a front surface of the substrate; and a protruding element positioned on the front surface of the substrate, and protruding from the front surface of the substrate toward the display panel, wherein the protruding element is positioned alternately to rows and columns of the light sources.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
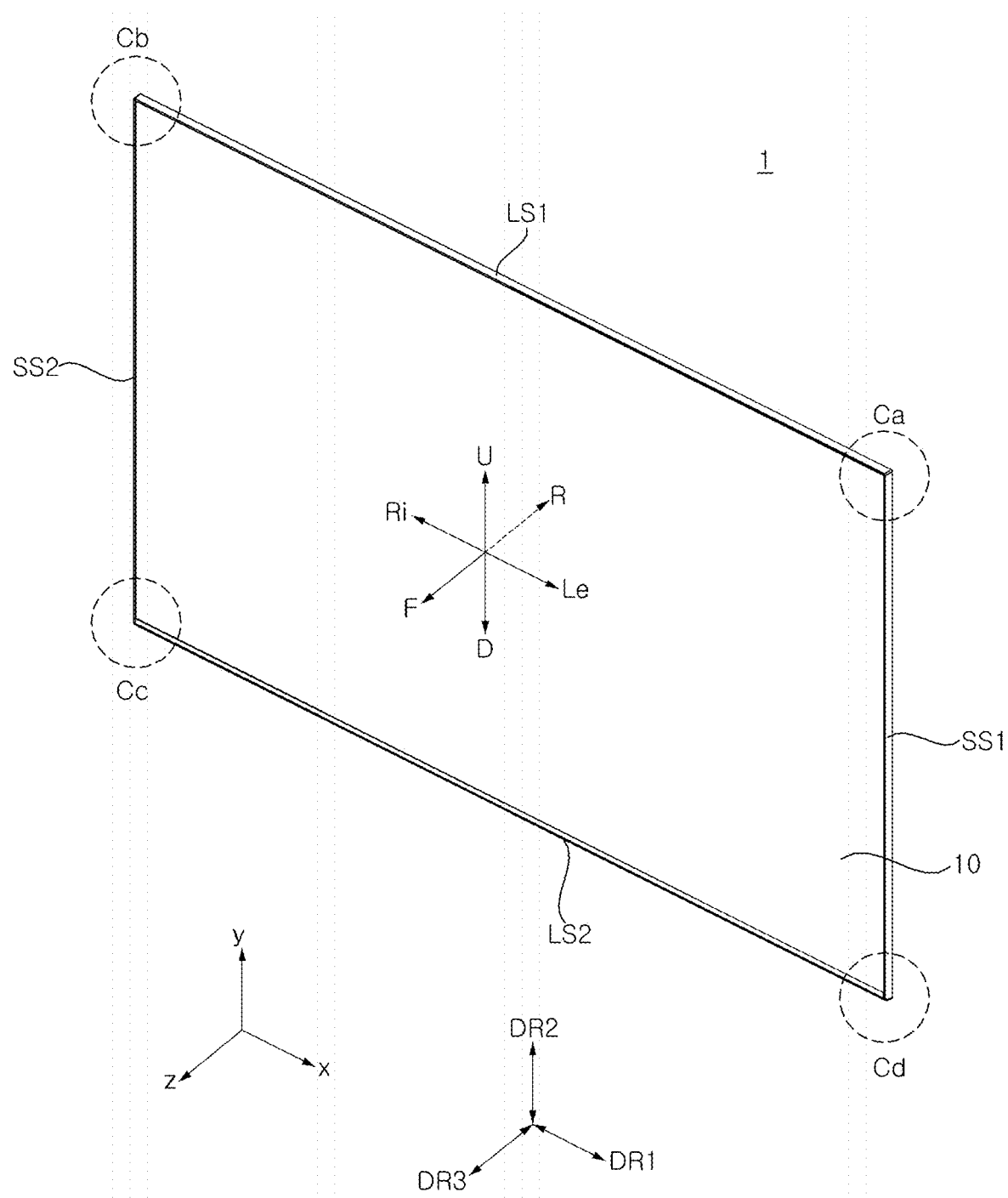
FIGS. 1 to 31 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

The accompanying drawings are used to help understand the technical idea of the present disclosure and the present disclosure is not limited by the accompanying drawings. The present disclosure should be construed to extend to any alterations, equivalents, and substitutes besides the accompanying drawings.

Although the terms "first," "second," etc. may be used herein to describe various elements, these elements are not limited by these terms. These terms are only used to distinguish one element from another. When a component is referred to as being "connected to" or "coupled to" another component, it can be directly connected to or coupled to another component, or intervening components can be present. In contrast, when a component is referred to as being "directly connected to" or "directly coupled to" another component, there are no intervening components present.

As used herein, a singular representation is intended to include a plural representation unless the context clearly indicates otherwise. in addition, the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof. The directions "up (U)," "down (D)," "left (Le)," "right (Ri)," "front (F)," and "rear (R)" shown in the drawings are only for the convenience of description, and the technical concept disclosed in the specification is not limited by these directions.

FIG. 1 is an overview illustrating a display device 1 including a display panel 10 displaying an image. As shown, the display device 1 includes a first long side LS1, a second long side LS2 opposite the first long side LS1, a first short side SS1 adjacent to the first long side LS1 and the second long side LS2, and a second short side SS2 opposite the first short side SS1. Also, for the convenience of explanation, it is illustrated and described that lengths of the first and second long sides LS1 and LS2 are greater than lengths of the first and second short sides SS1 and SS2, but the lengths of the first and second long sides LS1 and LS2 may be substantially equal to the lengths of the first and second short sides SS1 and SS2.

In addition, a direction parallel to the long sides LS1 and LS2 of the display device 1 can be referred to as a left-andright direction or a first direction DR1. The first short side SS1 can be referred to as a left side (Le, x), and the second short side SS2 can be referred to as a right side (Ri). A direction parallel to the short sides SS1 and SS2 of the display device 1 can be referred to as an up-and-down direction or a second direction DR2. Further, the first long side LS1 can be referred to as an upper or top side (U, y), and the second long side LS2 can be referred to as a lower or bottom side (D).

In addition, a direction perpendicular to the long sides LS1 and LS2 and the short sides SS1 and SS2 of the display device 1 can be referred to as a front-and-rear direction or a third direction DR3. Also, a direction in which the display panel 10 displays an image can be referred to as a front (F, z), and a direction opposite to the front can be referred to as a rear (R).

The first long side LS1, the second long side LS2, the first short side SS1, and the second short side SS2 can also be referred to as edges of the display device 1. In addition, points where the first long side LS1, the second long side LS2, the first short side SS1, and the second short side SS2 meet each other can be referred to as corners. A point where the first short side SS1 and the first long side LS1 meet can be referred to as a first corner Ca. A point where the first long side LS1 and the second short side SS2 meet can be referred to as a second corner Cb. A point where the second short side SS2 and the second long side LS2 meet can be referred to as a third corner Cc. A point where the second long side LS2 and the first short side SS1 meet can be referred to as a fourth corner Cd.

Figure 2:
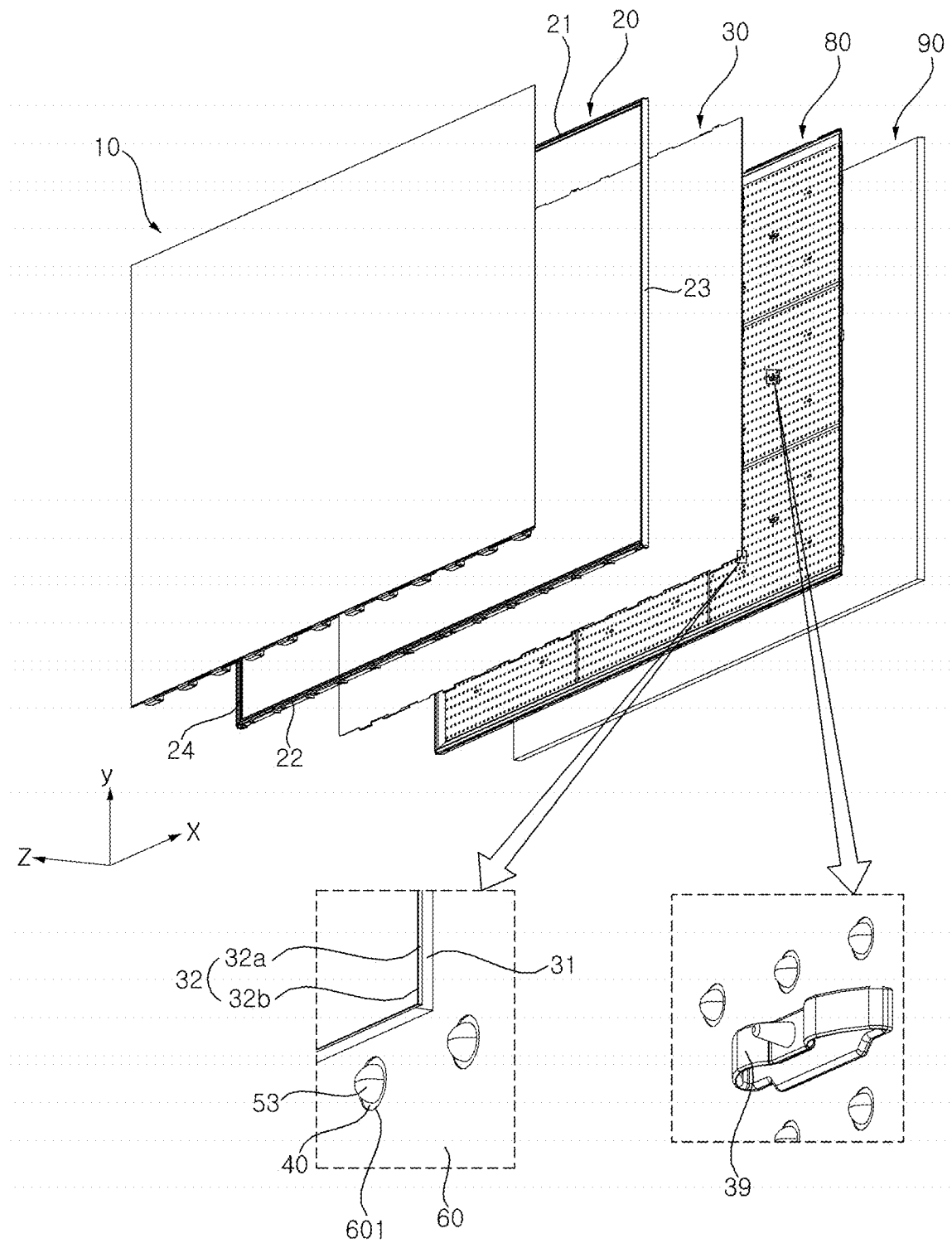

Referring to FIGS. 1 and 2, the display device 1 includes a display panel 10, a side frame 20, a backlight unit, a frame 80, and a back cover 90. The display panel 10 defines a front surface or side of the display device 1, and can display an image by outputting red, green, or blue (RGB) for each pixel by a plurality of pixels in accordance with timing. The display panel 10 can be divided into an active area in which an image is displayed and an inactive area in which no image is displayed. The display panel 10 includes, for example, a front substrate and a rear substrate disposed opposite each other with a liquid crystal layer interposed therebetween. The display panel 10 can also be referred to as an LCD panel 10.

In addition, the front substrate can include a plurality of pixels, each including red, green, and blue subpixels. The front substrate also outputs light corresponding to a color of red, green, or blue in response to a control signal. The rear substrate also includes switching elements for switching a pixel electrode. For example, the pixel electrode can change the molecular arrangement of a liquid crystal layer in response to a control signal input from the outside. In addition, the liquid crystal layer includes liquid crystal molecules and the arrangement of liquid crystal molecules can be changed according to a voltage difference generated between the pixel electrode and a common electrode. The liquid crystal layer can also transmit light provided from the backlight unit to the front substrate or block the light.

Further, the side frame 20 extends along an edge of the display panel 10 and ca cover the edge of the display panel 10. For example, the side frame 20 can include a plastic or metal material. The side frame 20 can also be referred to as a guide panel 20.

In addition, the backlight unit is disposed at the rear of the display panel 10. In particular, the backlight unit can be disposed at the front of the frame 80 and be coupled to the frame 80. The backlight unit can be driven by a full driving scheme or a partial driving scheme such as local dimming, impulsive, etc. As shown in FIG. 2, the backlight unit also includes light sources providing light to the front, a substrate 40 on which the light sources are mounted, lenses 53 that cover the light sources, a reflective sheet 60 that covers a front surface of the substrate 40, and an optical part 30 disposed at the front of the reflective sheet 60. Also, a reflective material can be coated on the front surface of the substrate 40.

Further, the optical part 30 is disposed opposite the display panel 10 with respect to the side frame 20 and allows light of the light source to be uniformly transmitted to the display panel 10. As shown in FIG. 2, the optical part 30 can include a diffusion plate 31 and an optical sheet 32.

In addition, the diffusion plate 31 is positioned between the reflective sheet 60 and the optical sheet 32 and allows diffuses light of the light source. An air gap can also be formed between the reflective sheet 60 and the diffusion plate 31. In particular, the air gap can serve as a buffer, and allow light of the light source to spread widely. A supporter 39 can also be positioned between the reflective sheet 60 and the diffusion plate 31, be coupled to the reflective sheet 60, and support the diffusion plate 31.

Further, the optical sheet 32 can be disposed adjacent to or in contact with a front surface of the diffusion sheet 31. The optical sheet 32 may also include at least one sheet. For example, the optical sheet 32 can include a plurality of sheets having different functions, and be bonded to each other or in close contact with each other. In another example, a first optical sheet 32a can be a diffusion sheet, and a second optical sheet 32b can be a prism sheet.

In addition, the frame 80 is disposed at the rear of the backlight unit. As shown in FIG. 2, the display panel 10, the side frame 20, and the backlight unit can be coupled to the frame 80. The frame 80 also supports the components of the display device 10. For example, the frame 80 can include a metal material such as an aluminum alloy. The frame 80 can also be referred to as a main frame 80, a module cover 80, or a cover bottom 80. As shown, the back cover 90 covers the rear of the frame 80, and is coupled to the frame 80. For example, the back cover 90 can be an injection molded product of a resin material. As another example, the back cover 90 may include a metal material.

Figure 3:
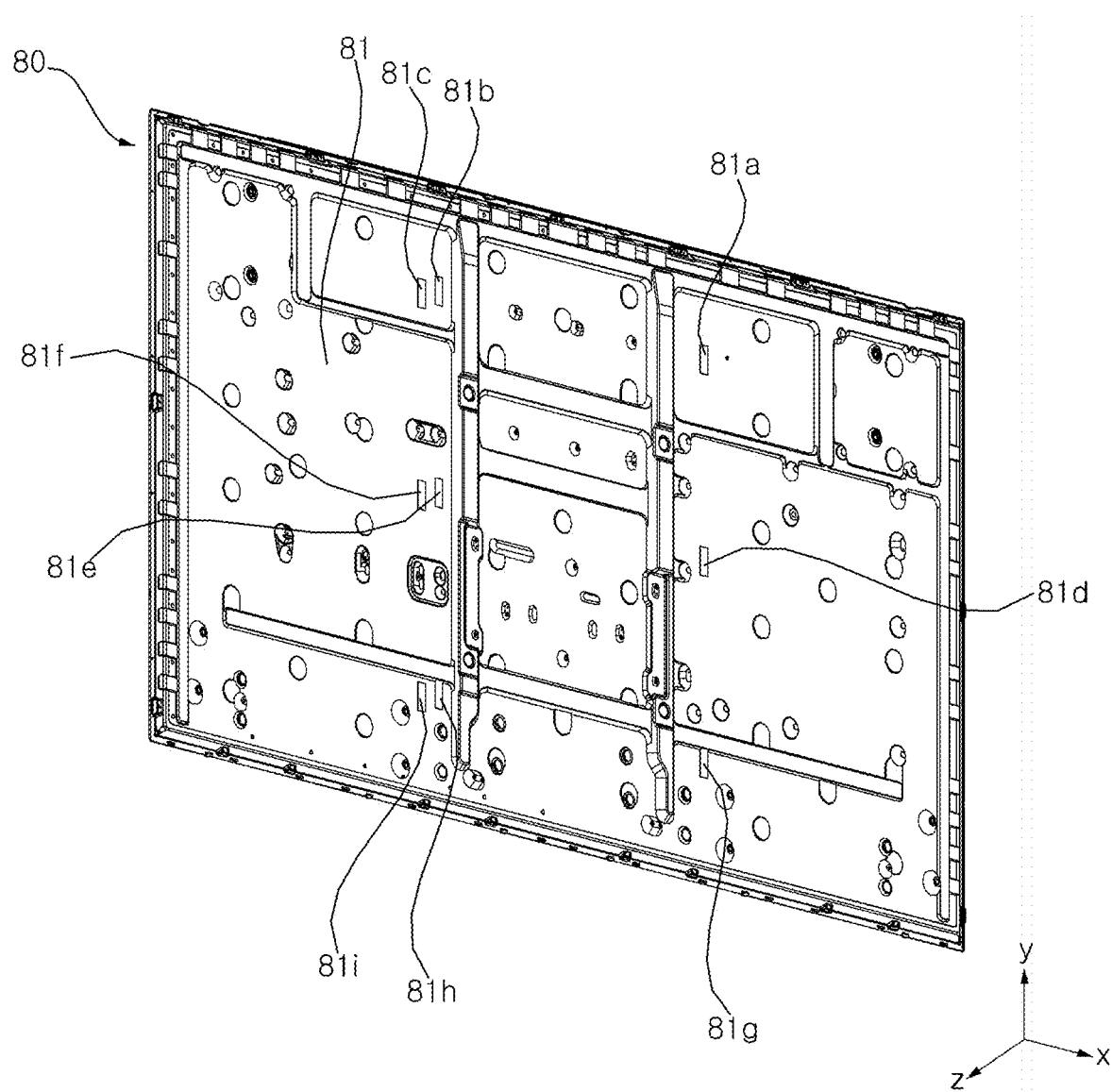
Figure 4:
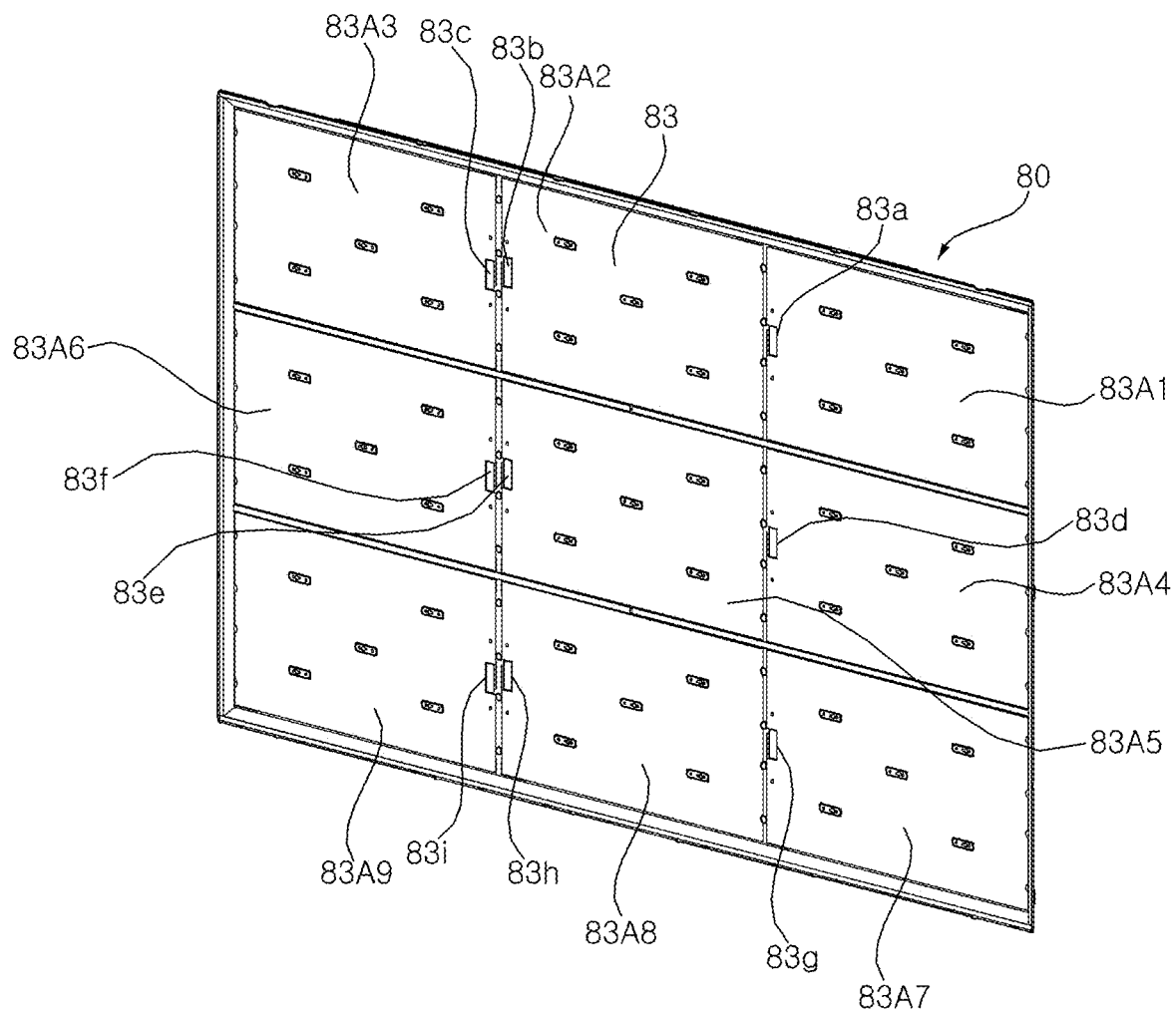

Next, referring to FIG. 3, a flat portion 81 defines a front surface or side of the frame 80. A plurality of frame holes 81a, 81b, 81c, 81d, 81e, 81f, 81g, 81h, and 81i are also formed in the flat portion 81. Referring to FIGS. 3 and 4, a heat sink 83 can cover a front surface of the flat portion 81, and be coupled to the flat portion 81. A plurality of heat sink holes 83a, 83b, 83c, 83d, 83e, 83f, 83g, 83h, and 83i can be formed in the heat sink 83, and be aligned with the plurality of frame holes 81a, 81b, 81c, 81d, 81e, 81f, 81g, 81h, and 81i. The heat sink 83 can also be omitted.

Figure 5:
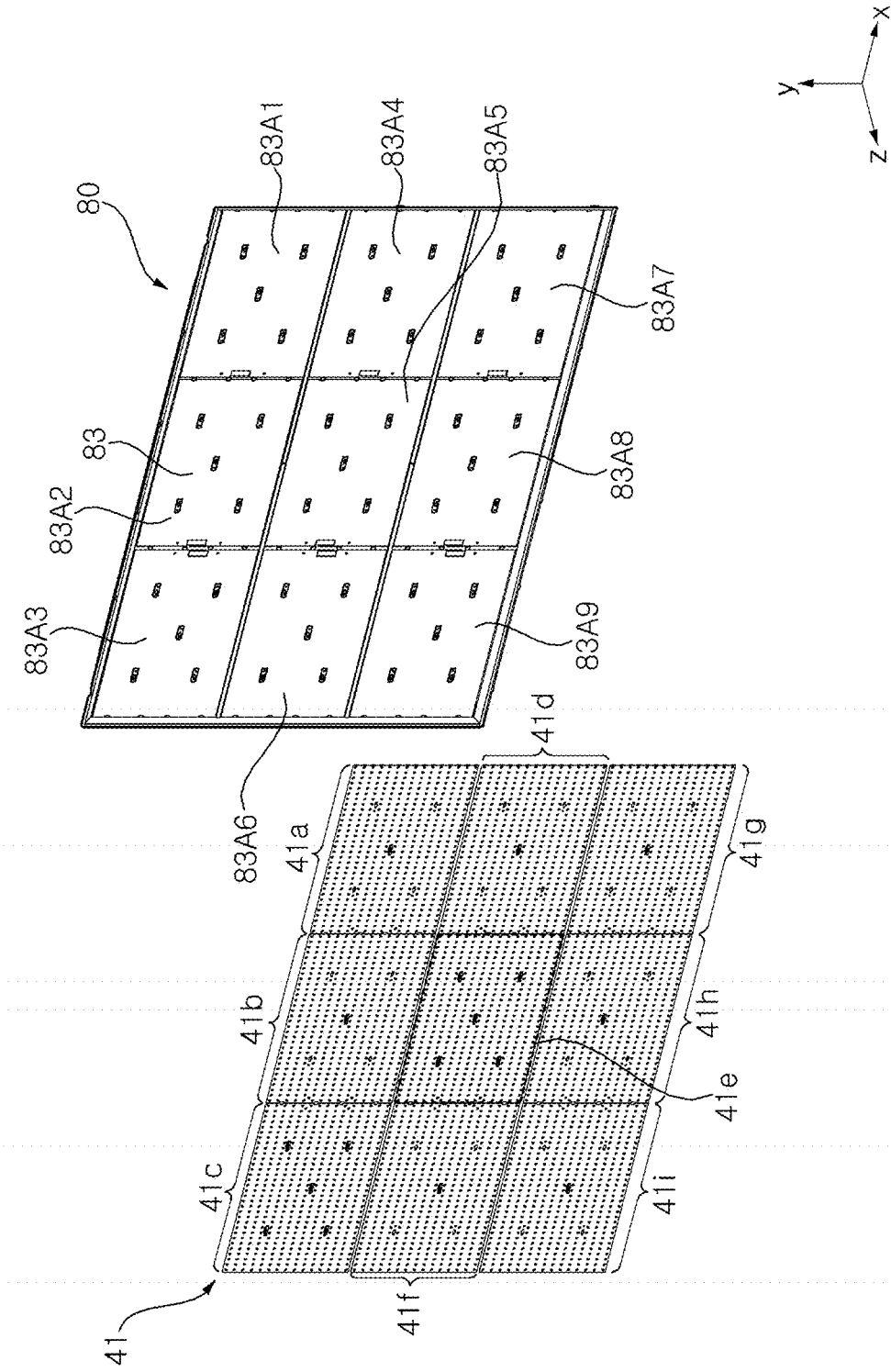
Figure 6:
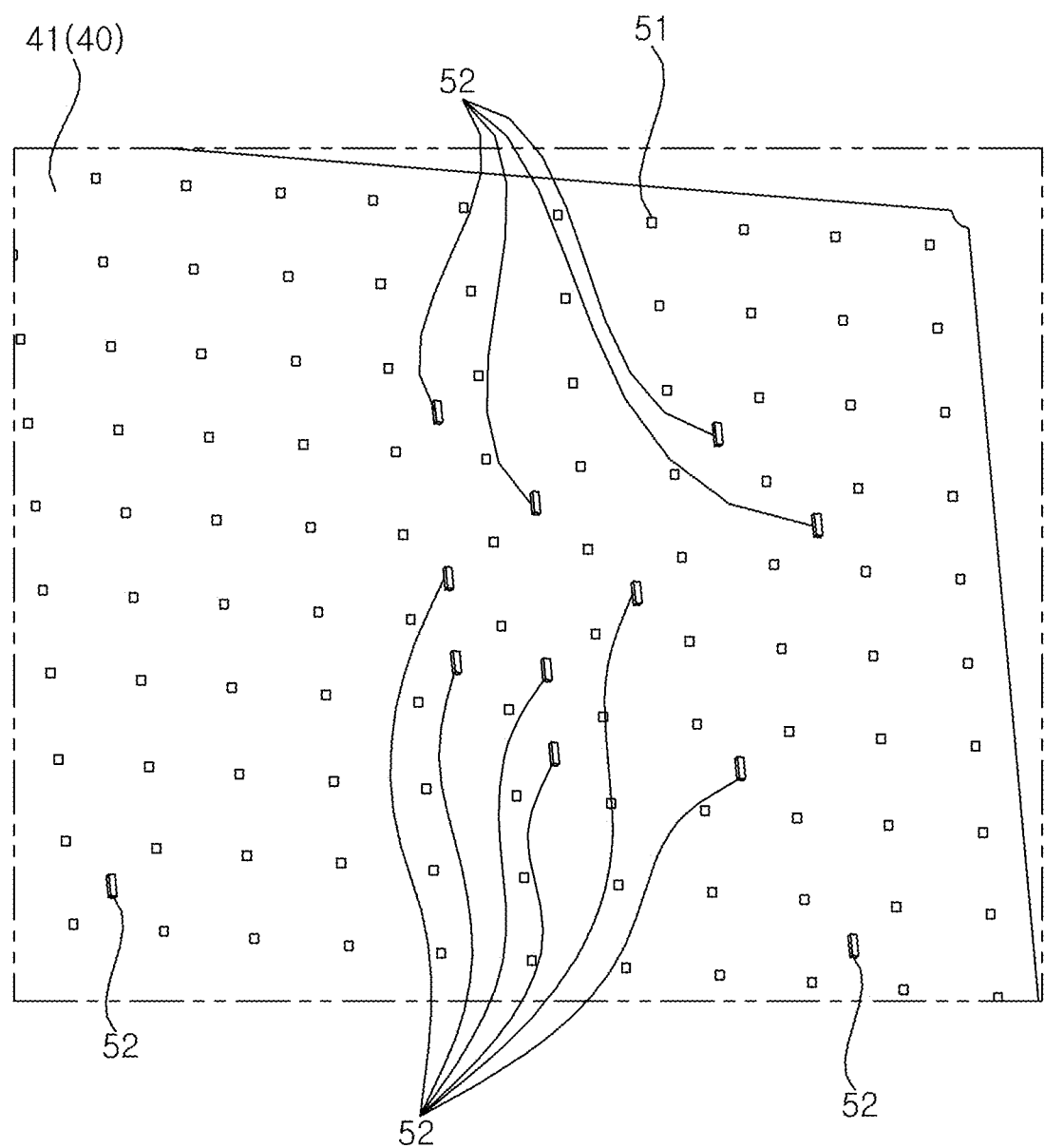

Referring to FIGS. 5 and 6, a substrate 41 is coupled to the front surface of the frame 80 or the heat sink 83. In particular, the substrate 41 can be a printed circuit board (PCB). For example, the substrate 41 may include at least one of polyethylene terephthalate (PET), glass, polycarbonate (PC), or silicon. The substrate 41 can also have the shape of a plate and can be referred to as a substrate 40.

At least one substrate 41 can also be provided. In more detail, a plurality of substrates 41a, 41b, 41c, 41d, 41e, 41f, 41g, 41h, and 41i can respectively cover a plurality of areas (or regions) 83A1, 83A2, 83A3, 83A4, 83A5, 83A6, 83A7, 83A8, and 83A9 of the heat sink 83. As shown in FIG. 6, a light source 51 can be mounted on the front surface of the substrate 41. As shown, a plurality of light sources 51 can be arranged in a matrix form on the front surface of the substrate 41. In more detail, the light source 51 can be a light emitting diode (LED) chip or an LED package. The light source 51 can also be configured as a colored LED that emits light of at least one of colors such as red, green, and blue, or a white LED. The light source 51 may also be a mini-LED. Further, an electrode pattern can be formed on the substrate 41, and connect an adaptor (connector) and the light source 51. A power supply board provides power to the light source 51 through the substrate 41. For example, the electrode pattern can be a carbon nanotube electrode pattern.

Figure 7:
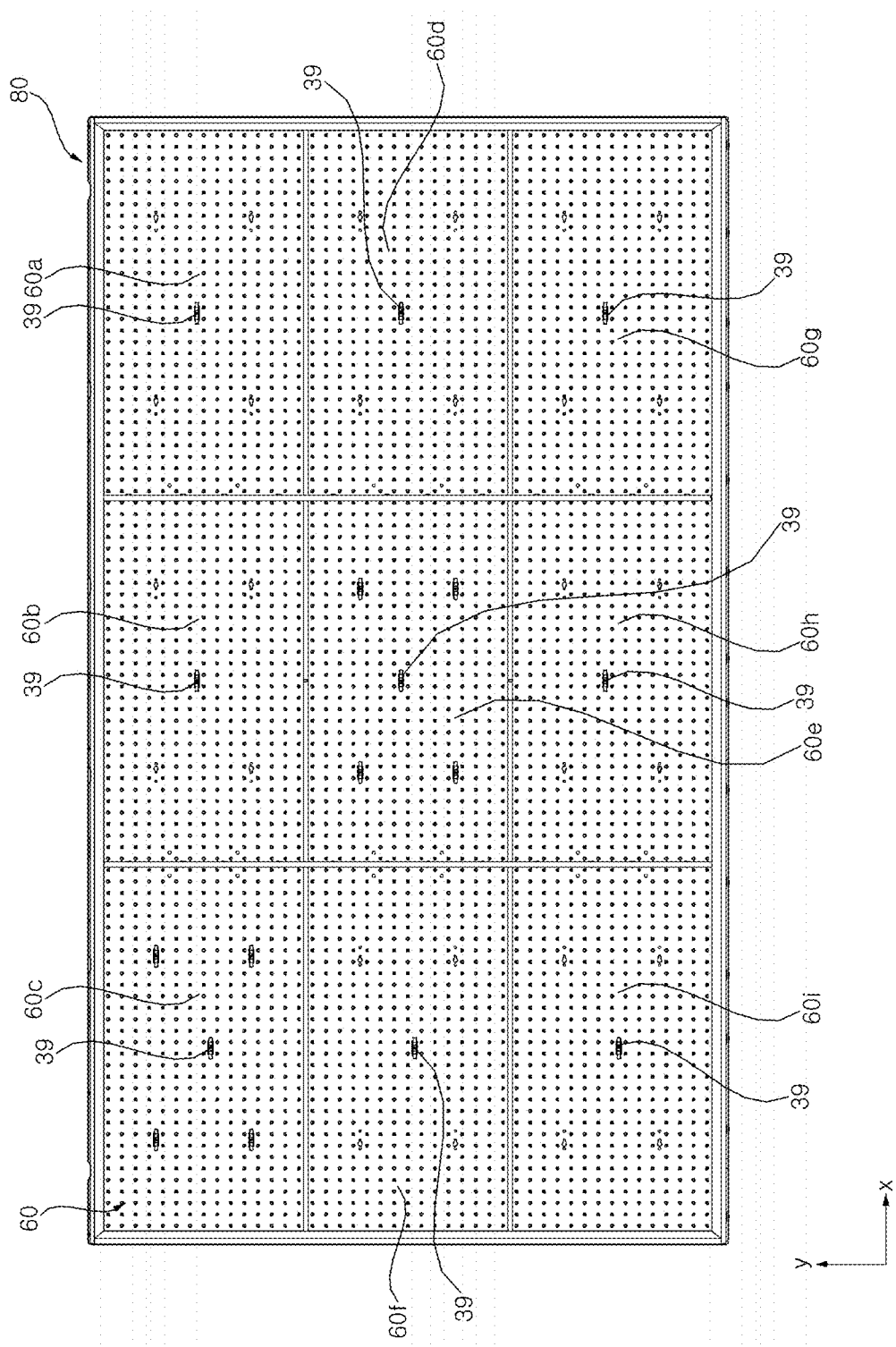
Figure 8:
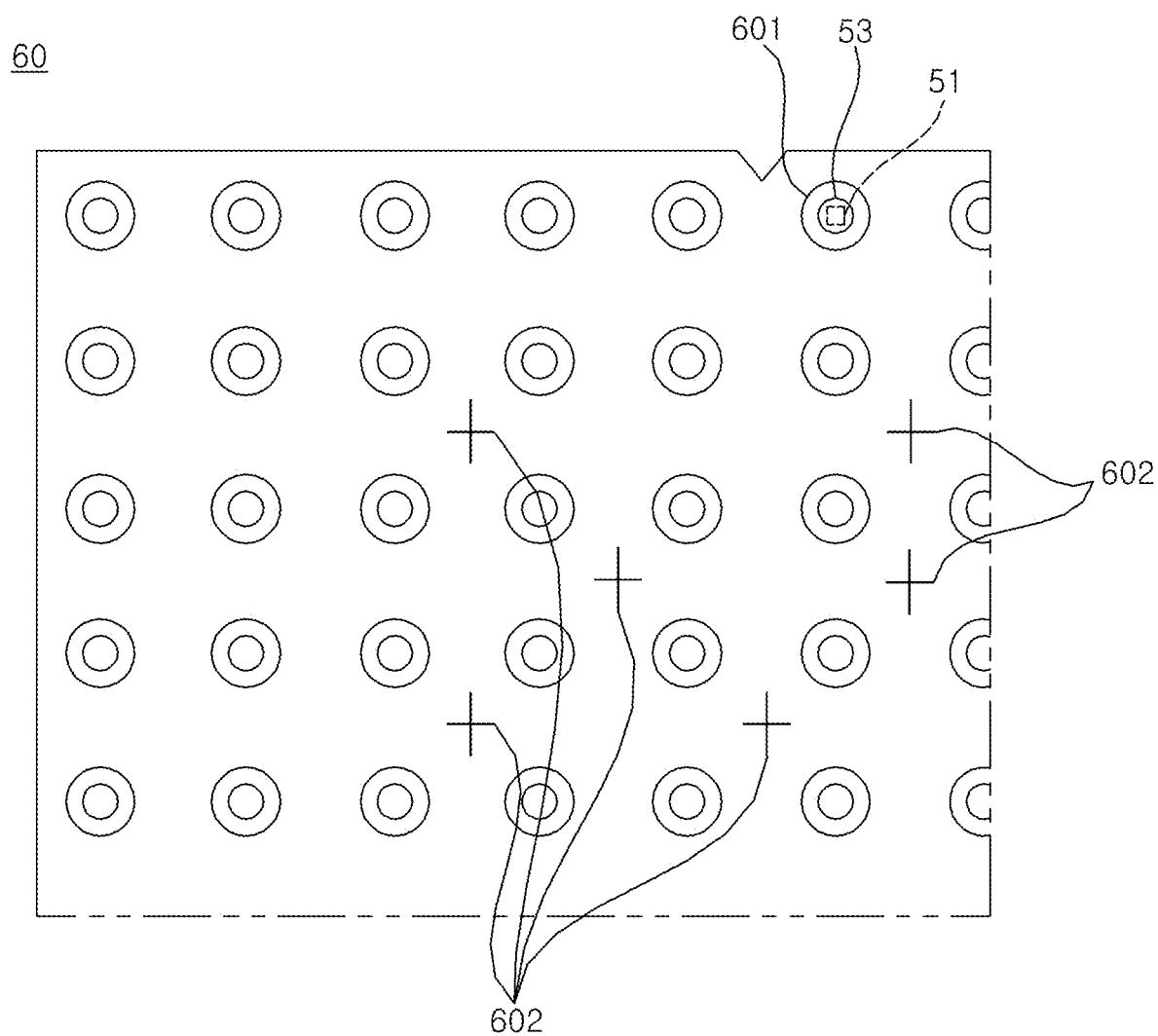
Figure 9:
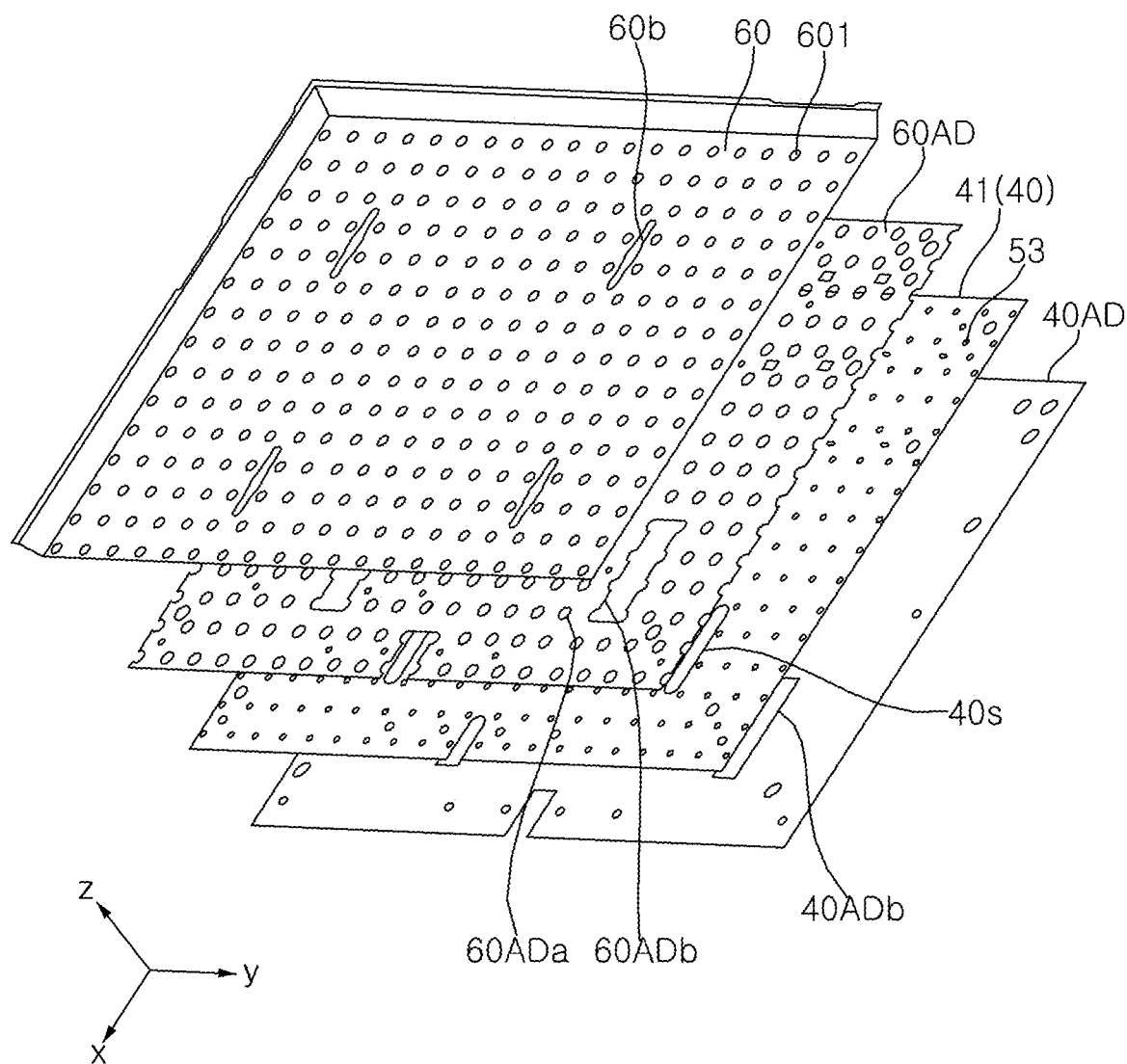

Next, referring to FIGS. 7 to 9, the substrate 41 can be attached to the front surface of the heat sink 83 by an adhesive member 40AD such as a double-sided tape. Alternatively, an adhesive can be applied to a rear surface of the substrate 41. The reflective sheet 60 can also be attached to the front surface of the substrate 41 by an adhesive member 60AD such as a double-sided tape. Alternatively, an adhesive can be applied to a rear surface of the reflective sheet 60. In addition, the reflective sheet 60 reflects light provided by the light source 51 or reflects light reflected from the diffusion plate 31 to the front (see FIG. 2). For example, the reflective sheet 60 may include at least one of aluminum (Al), silver (Ag), gold (Au), or titanium dioxide (TiO2), namely, a metal and/or a metal oxide having high reflectivity. A resin can also be deposited on or applied to the reflective sheet 60. Further, at least one reflective sheet 60 may be provided and a plurality of reflective sheets 60a, 60b, 60c, 60d, 60e, 60f, 60g, 60h, and 60i can cover the substrate(s) 41 (see FIG. 5).

In addition, a hole 601 is formed in the reflective sheet 60, and a light source 51 or a lens 53 covering the light source 51 is disposed in the hole 601. The lens 53 can pass through a hole 60Ada of the adhesive member 60AD and a hole 60a of the reflective sheet 60. The lens 53 can also include a silicon material, and allow a light beam angle to be widened. A diameter of the hole 601 can also be greater than a diameter of the lens 53. Further, the number of holes 601 can be the same as the number of light sources 51 or lenses 53.

In addition, the supporter 39 can sequentially pass through a hole 60b of the reflective sheet 60, a hole 60ADb of the adhesive member 60AD, a hole 40s of the substrate 41, and a hole 40ADb of the adhesive member 40AD to be detachably coupled to the heat sink 83 and/or the frame 80. A front end of the supporter 39 can also support a rear surface of the diffusion plate 31 (see FIG. 2).

Figure 10:
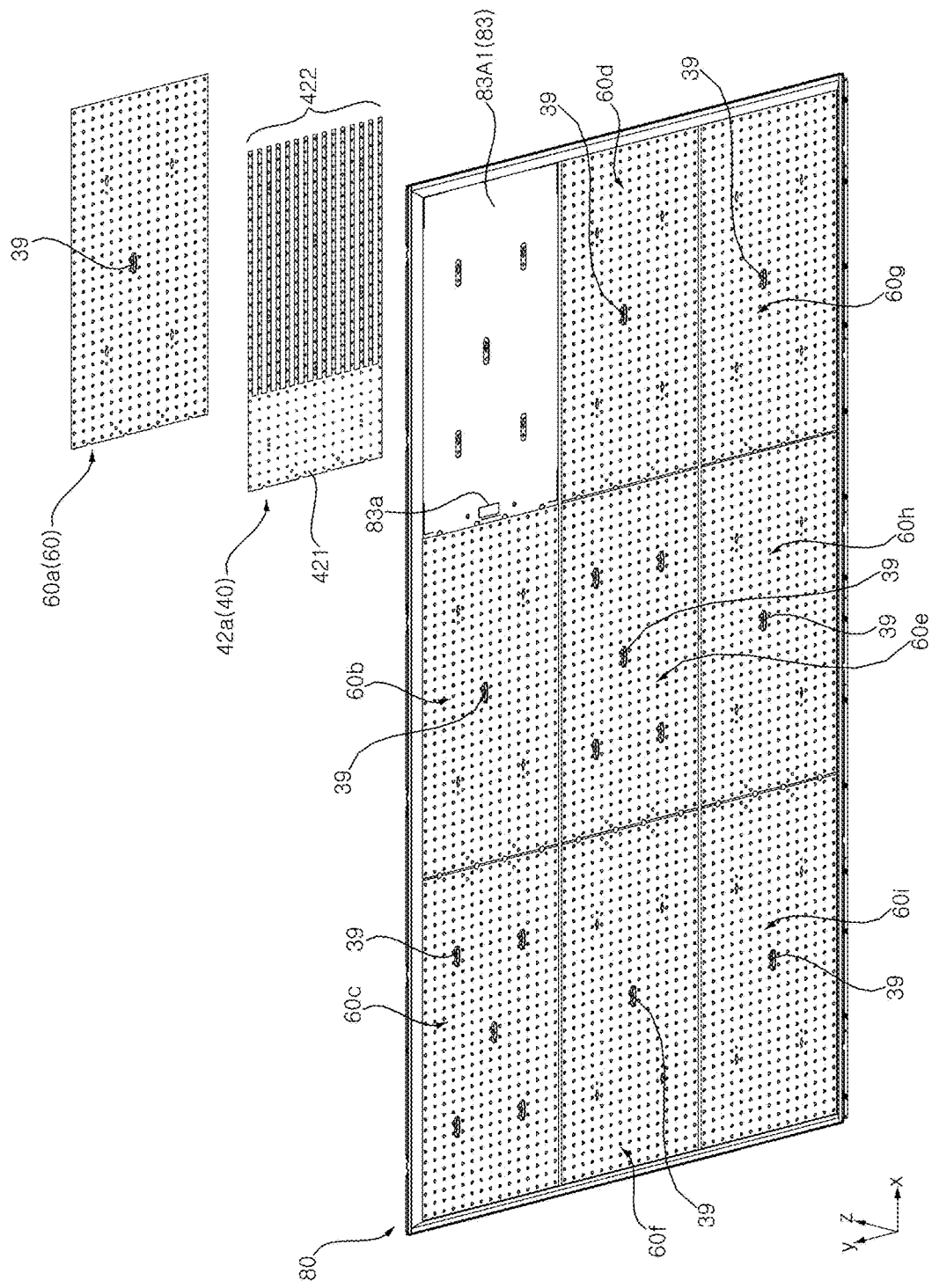
Figure 11:
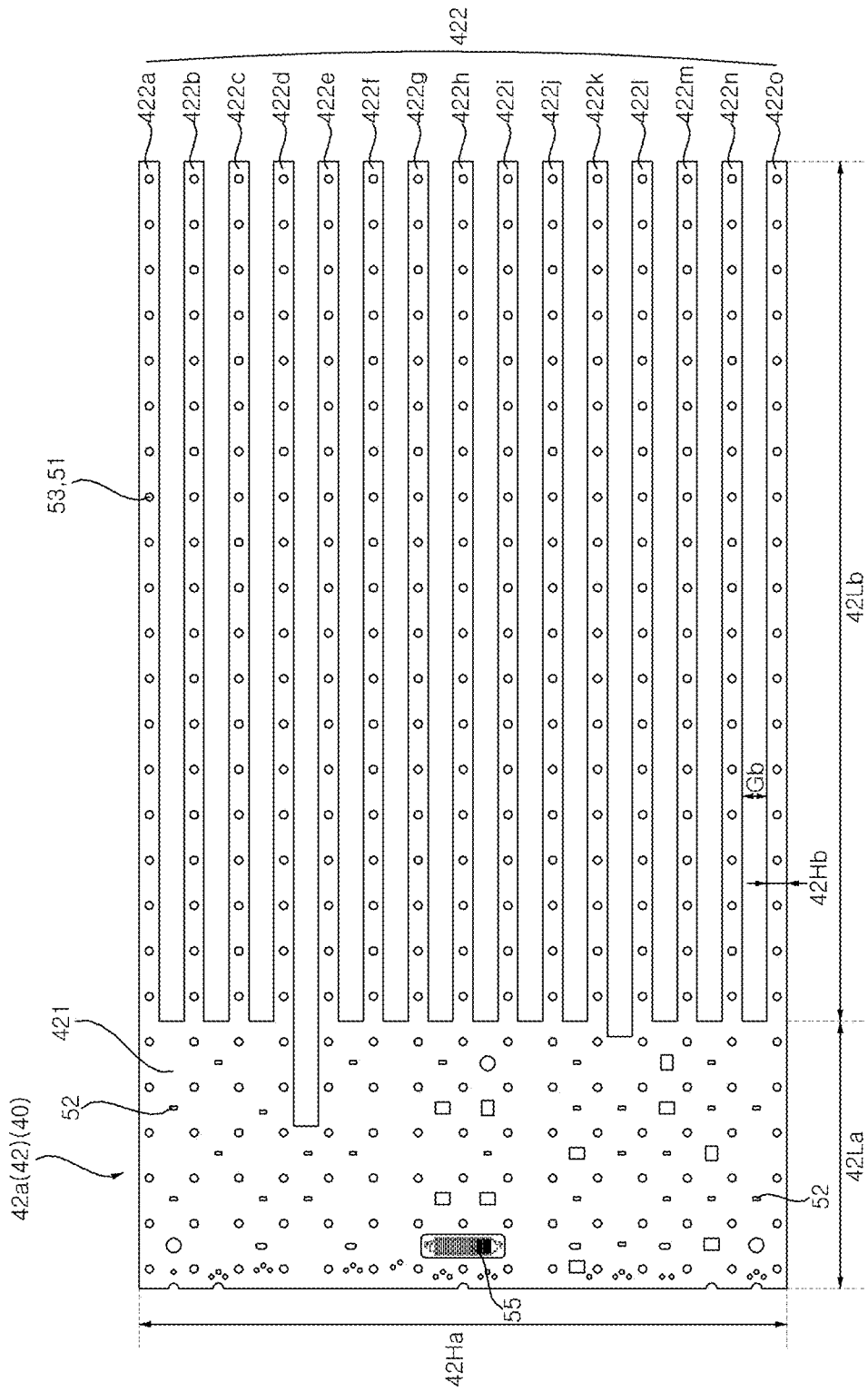

Referring to FIGS. 10 and 11, a substrate 42 can be coupled to the front surface of the frame 80 or the heat sink 83. The substrate 42 can be a printed circuit board (PCB). For example, the substrate 42 may include at least one of polyethylene terephthalate (PET), glass, polycarbonate (PC), or silicon. As shown in FIG. 11, the substrate 42 can also have the shape of a fork. The substrate 42 can be referred to as a substrate 40.

In addition, as shown, the substrate 42 includes a body 421 and legs 422 in which the body 421 can be elongated. Also, the legs 422 extend from one long side of the body 421 in a direction intersecting the body 421. A longitudinal direction of the body 421 can also be defined in the vertical direction, and a longitudinal direction of each of the legs 422 can be defined in the horizontal direction. A width 42La of the body 421 can be less than a length 42Ha of the body 421, and be less than or similar to a length 42Lb of each of the legs 422. Further, the legs 422 can be spaced apart from each other in the longitudinal direction of the body 421, and a gap Gb between the legs 422 can be the same as a width 42Hb of the leg 422.

In addition, at least one substrate 42 can be provided. A plurality of substrates 42 can also be respectively coupled or attached to a plurality of areas (or regions) 83A1, 83A2, 83A3, 83A4, 83A5, 83A6, 83A7, 83A8, and 83A9 (see FIG. 4) of the heat sink 83. Further, the light source 51 can be mounted on a front surface of the substrate 42. A plurality of light sources 51 can also be arranged in a matrix form on front surfaces of the body 421 and the legs 422. In addition, the reflective sheet 60 can be coupled or attached to the front surface of the substrate 42, and have a hole in which the light source 51 or a lens covering the light source 51 is disposed. A plurality of reflective sheets 60a, 60b, 60c, 60d, 60e, 60f, 60g, 60h, and 60i can also cover the substrate(s) 42.

In addition, the supporter 39 can sequentially pass through the reflective sheet 60 and the substrate 42 so as to be detachably coupled to the heat sink 83 and/or the frame 80. A front end of the supporter 39 also supports a rear surface of the diffusion plate 31 (see FIG. 2).

Referring back to FIG. 6 and FIG. 11, the substrate 40 can be a single sided PCB. In particular, the single sided PCB can be referred to as a 1-layer PCB or a single layer PCB. Also, light sources 51 and diodes 52 can be mounted on the front surface of the substrate 40. Also, diodes 52 can be disposed between the light sources 51. In particular, the diodes 52 can be ESD (electrostatic discharge) protection diodes for preventing electrostatic discharge (ESD). For example, the diodes 52 may be Zener diodes, and block reverse current. The diode 52 can also be referred to as a protruding element 52 or a protruding portion 52. In addition, a connector, a jumper, a TP point, a pattern for more reliable ESD ground, and the like can be provided on the front surface of the substrate 40, and a screw hole may also be formed in the substrate 40.

Figure 12:
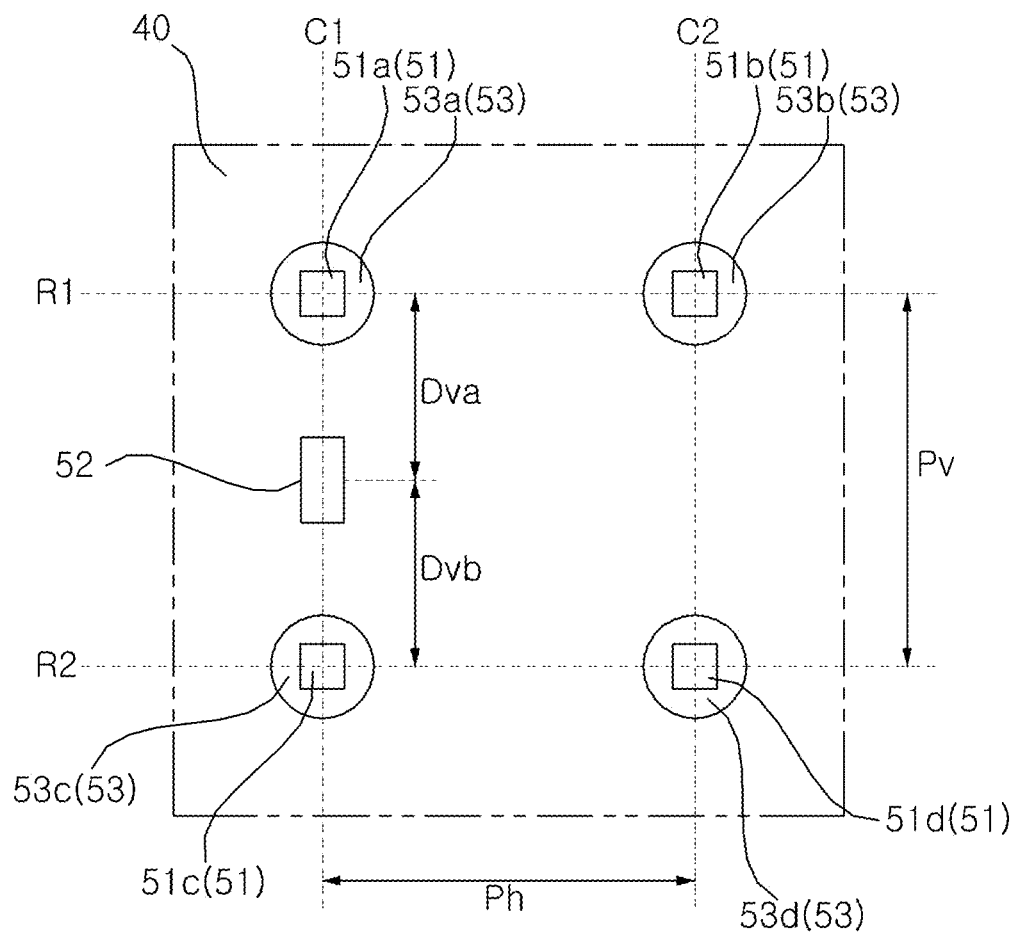
Figure 13:
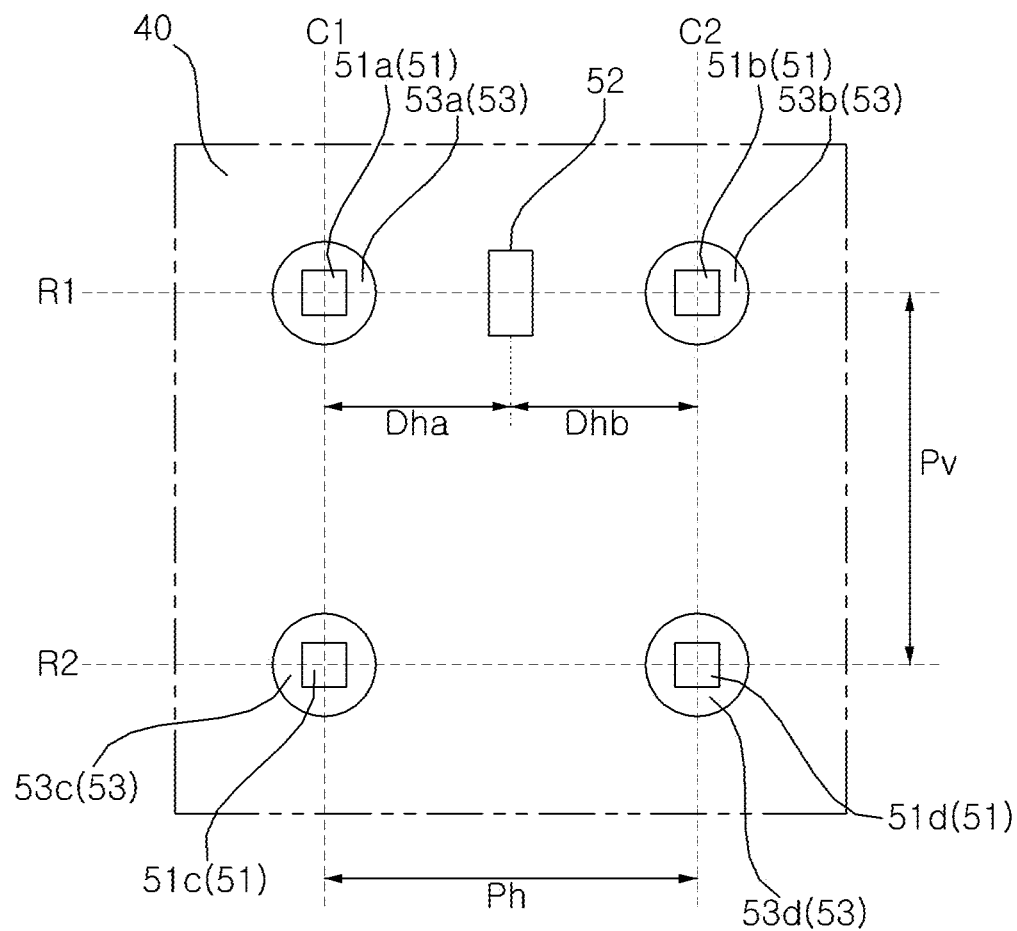

Referring to FIGS. 12 and 13, the light sources 51 can be arranged in a matrix form on the front surface of the substrate 40. As shown, the lenses 53 can cover the light sources 51, and be fixed on the substrate 40. For example, the light source 51 can have a cuboid shape, and the lens 53 can have a dome or hemisphere shape. The lens 53 may include a silicon material, and allows a light beam angle to be winded.

Further, the light sources 51 are spaced apart from each other by a predetermined distance Ph in a row direction (i.e., the horizontal direction). The distance Ph can be referred to as a horizontal pitch Ph. The light sources 51 are also spaced apart from each other by a predetermined distance Pv in a column direction (i.e., the vertical direction). The distance Pv can be referred to as a vertical pitch Pv.

For example, a first light source 51a and a second light source 51b can be located on a first row R1, and a third light source 51c and a fourth light source 51d can be located on a second row R2. Here, the first light source 51a and the third light source 51c can be located on a first column C1, and the second light source 51b and the fourth light source 51d can be located on a second column C2.

Referring to FIG. 12, the diode 52 can be positioned between the first row R1 and the second row R2, and be located on the first column C1. That is, with respect to the first column C1, the diode 52 can be aligned with the first and third light sources 51a and 51c.

In this instance, the diode 52 may intrude in a coverage of the first light source 51a and/or a coverage of the third light source 51c. Here, the coverage includes a range (region) of light having a predetermined ratio of the luminance to the surface luminance of the lens covering the light source. A radius of the coverage of the first light source 51a can be greater than a distance from the first light source 51a to a center between the first and third light sources 51a and 51c. A radius of the coverage of the third light source 51c can also be greater than a distance from the third light source 51c to the center between the first and third light sources 51a and 51c.

In addition, a distance Dva between the diode 52 and the first light source 51a can be equal to a distance Dvb between the diode 52 and the third light source 51c. Also, the diode 52 may intrude in the coverage of each of the first light source 51a and the third light source 51c at the middle between the first light source 51a and the third light source 51c.

Alternatively, unlike FIG. 12, the distance Dva may be less than or greater than the distance Dvb. In particular, the diode 52 can be disposed closer to the first light source 51a than the third light source 51c to thereby intrude in the coverage of the first light source 51a, or be disposed closer to the third light source 51c than the first light source 51a to thereby intrude in the coverage of the third light source 51. Thus, due to the diode 52, adequate mixing of light of the first light source 51a and light of the third light source 51c may not be achieved causing a portion or region of the display panel corresponding to the diode 52 to be relatively dark or stained.

Referring to FIG. 13, the diode 52 can be positioned between the first column C1 and the second column C2, and be located on the first row R1. That is, with respect to the first row R1, the diode 52 is aligned with the first and second light sources 51a and 51b. In this instance, the diode 52 may intrude in a coverage of the first light source 51a and/or a coverage of the second light source 51b. Here, the coverage includes a range (region) of light having a predetermined ratio of the luminance to the surface luminance of the lens covering the light source. A radius of the coverage of the first light source 51a can be greater than a distance from the first light source 51a to a center between the first and second light sources 51a and 51b. Also, a radius of the coverage of the second light source 51b can be greater than a distance from the second light source 51b to the center between the first and second light sources 51a and 51b. A distance Dha between the diode 52 and the first light source 51a can also be equal to a distance Dhb between the diode 52 and the second light source 51b. In addition, the diode 52 may intrude in the coverage of each of the first light source 51a and the second light source 51b at the middle between the first light source 51a and the second light source 51b.

Alternatively, unlike FIG. 13, the distance Dha may be less than or greater than the distance Dhb. In particular, the diode 52 can be disposed closer to the first light source 51a than the second light source 51b to thereby intrude in the coverage of the first light source 51a, or be disposed closer to the second light source 51b than the first light source 51a to thereby intrude in the coverage of the second light source 51b. Thus, due to the diode 52, adequate mixing of light of the first light source 51a and light of the second light source 51b may not be achieved causing a portion or region of the display panel corresponding to the diode 52 to be relatively dark or stained.

Figure 14:
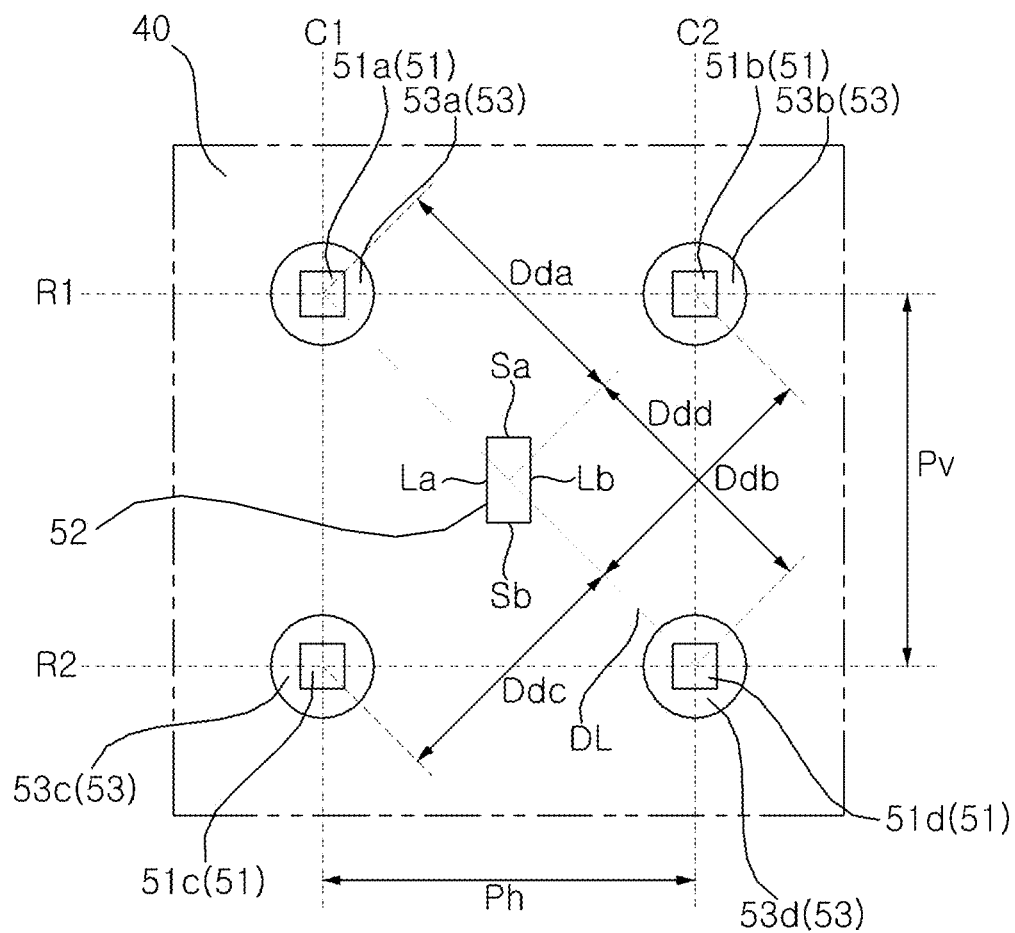
Figure 15:
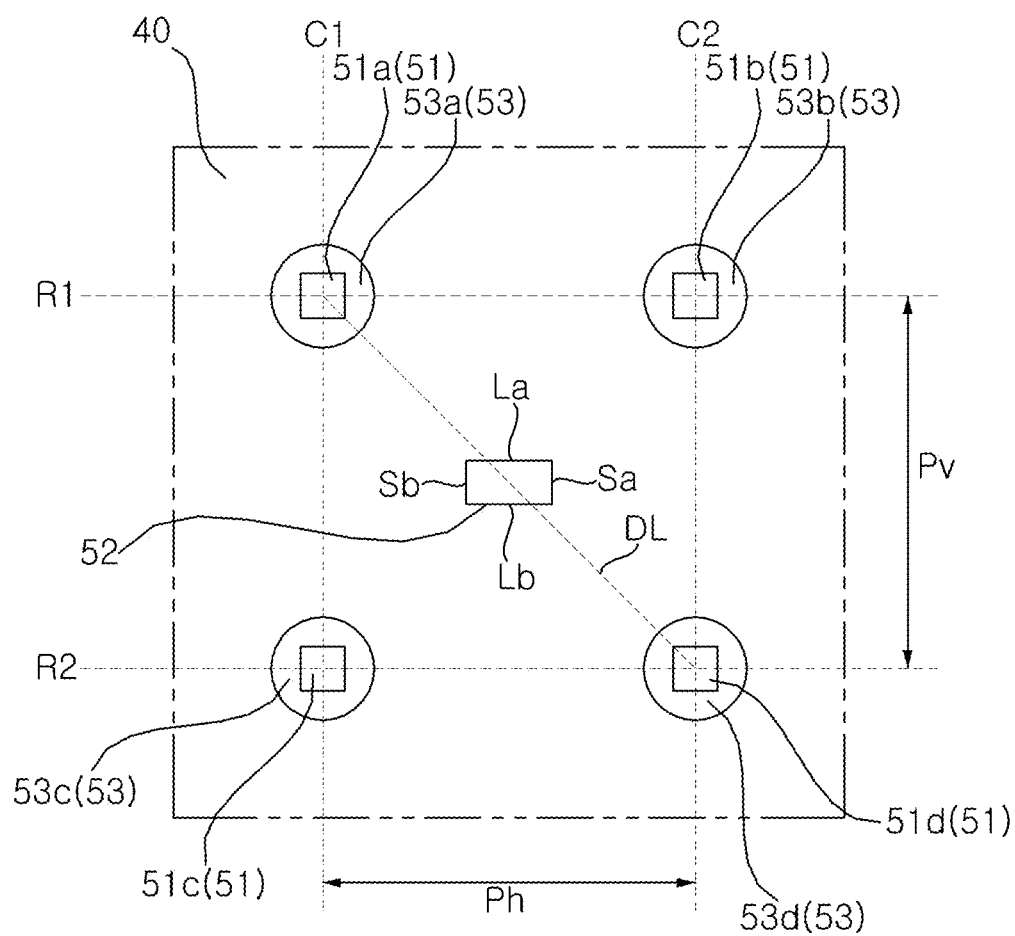

Referring to FIGS. 14 and 15, the diode 52 can be positioned between the first row R1 and the second row R2, and be positioned between the first column C1 and the second column C2. In particular, the diode 52 can be located on an imaginary straight line (i.e., a diagonal line) DL connecting the first light source 51a, which is the first light source of the first row R1 (or nth light source), and the fourth light source 51d, which is the second light source of the second row R2 (or (n+1)th light source). That is, the diode 52 can be disposed obliquely or offset to the first and second rows R1 and R2 and the first and second columns C1 and C2. The diode 52 may be located at a center of the straight line DL, or be offset from the center of the straight line DL to any one of the first to fourth light sources 51a, 51b, 51c, and 51d. In this instance, the diode 52 does not intrude in coverages of the first to fourth light sources 51a, 51b, 51c, and 51d, or intrudes relatively less in the coverages than those of the examples described above with reference to FIGS. 12 and 13.

In addition, a distance Dda between the diode 52 and the first light source 51a can be greater than the distance Dva (see FIG. 12), and a distance Ddc between the diode 52 and the third light source 51c can be greater than the distance Dvb (see FIG. 12). Thus, the diode 52 does not intrude in the coverage of each of the first light source 51a and the third light source 51c, or intrudes relatively less in the coverages than that of the example described above with reference to FIG. 12.

Further, the distance Dda between the diode 52 and the first light source 51a can be greater than the distance Dha (see FIG. 13), and a distance Ddb between the diode 52 and the second light source 51b can be greater than the distance Dhb (see FIG. 13). Thus, the diode 52 does not intrude in the coverage of each of the first light source 51a and the second light source 51b, or intrudes relatively less in the coverages than that of the example described above with reference to FIG. 13.

For example, the distance Ddb between the diode 52 and the second light source 51b can be equal to the distance Ddc between the diode 52 and the third light source 51c, and a distance Ddd between the diode 52 and the fourth light source 51d can be equal to the distance Dda between the diode 52 and the first light source 51a. Therefore, the diode 52 does not intrude in the coverage of each of the second light source 51b and the fourth light source 51d, or may intrude relatively less in the coverages.

Thus, adequate mixing of light of the light sources around the diode 52, namely, the first to fourth light sources 51a, 51b, 51c, and 51d, can be achieved. As a result, the formation of a darker or stained portion on a display region corresponding to the diode 52 can be reduced or suppressed.

In addition, the diode 52 can have a cross section of a rectangular shape. Referring to FIG. 14, the cross section can have long sides La and Lb that are parallel to the vertical direction and short sides Sa and Sb that are parallel to the horizontal direction. Referring to FIG. 15, the cross section may have long sides La and Lb that are parallel to the horizontal direction and short sides Sa and Sb that are parallel to the vertical direction. Alternatively, the cross section can be inclined in a direction that intersects the horizontal direction and the vertical direction.

Figure 16:
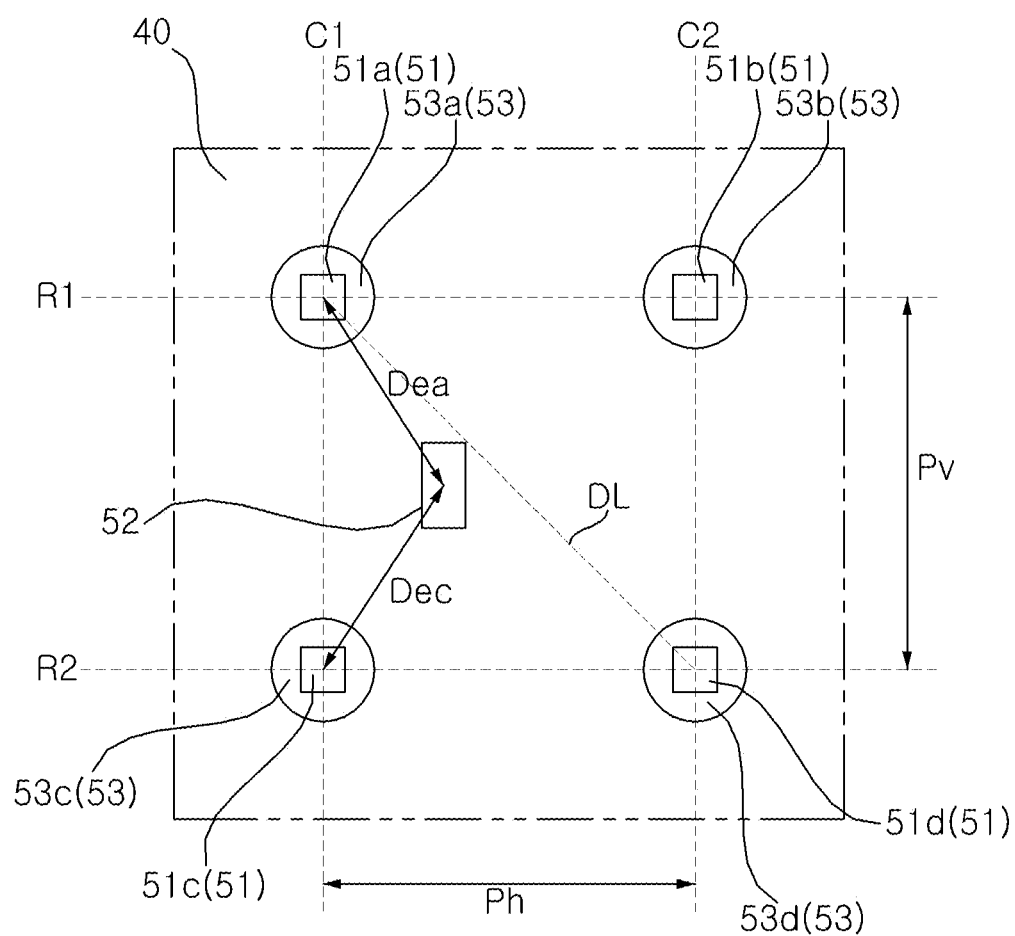

Referring to FIG. 16, the diode 52 can be positioned to be offset from the center of the straight line DL to the first column C1. In particular, a distance Dea between the diode 52 and the first light source 51a can be greater than the distance Dva (see FIG. 12), and a distance Dec between the diode 52 and the third light source 51c can be greater than the distance Dvb (see FIG. 12). In this instance, the diode 52 does not intrude in coverages of the first and third light sources 51a and 51c, or intrudes relatively less in the coverages than that of the example described above with reference to FIG. 12.

Alternatively, the diode 52 can be positioned to be offset from the center of the straight line DL to the first row R1. In this instance, the diode 52 does not intrude in coverages of the first and second light sources 51a and 51b, or intrudes relatively less in the coverages than that of the example described above with reference to FIG. 13.

Figure 17:
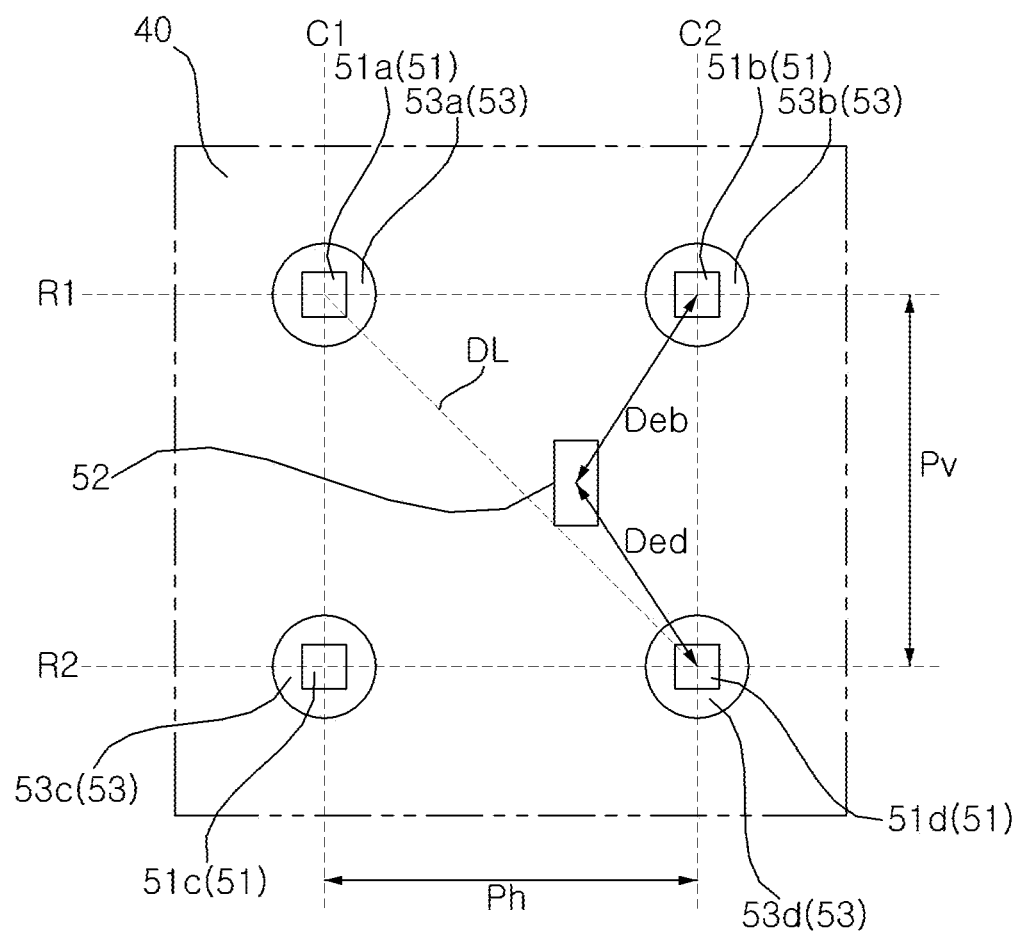

Referring to FIG. 17, the diode 52 can be positioned to be offset from the center of the straight line DL to the second column C2. In particular, a distance Deb between the diode 52 and the second light source 51b can be greater than the distance Dva (see FIG. 12), and a distance Ded between the diode 52 and the fourth light source 51d can be greater than the distance Dvb (see FIG. 12). In this instance, the diode 52 does not intrude in coverages of the second and fourth light sources 51b and 51d, or intrudes relatively less in the coverages than that of the example described above with reference to FIG. 12.

Alternatively, the diode 52 can be positioned to be offset from the center of the straight line DL to the second row R2. In this instance, the diode 52 does not intrude in coverages of the third and fourth light sources 51c and 51d, or intrudes relatively less in the coverages than that of the example described above with reference to FIG. 13.

Figure 18:
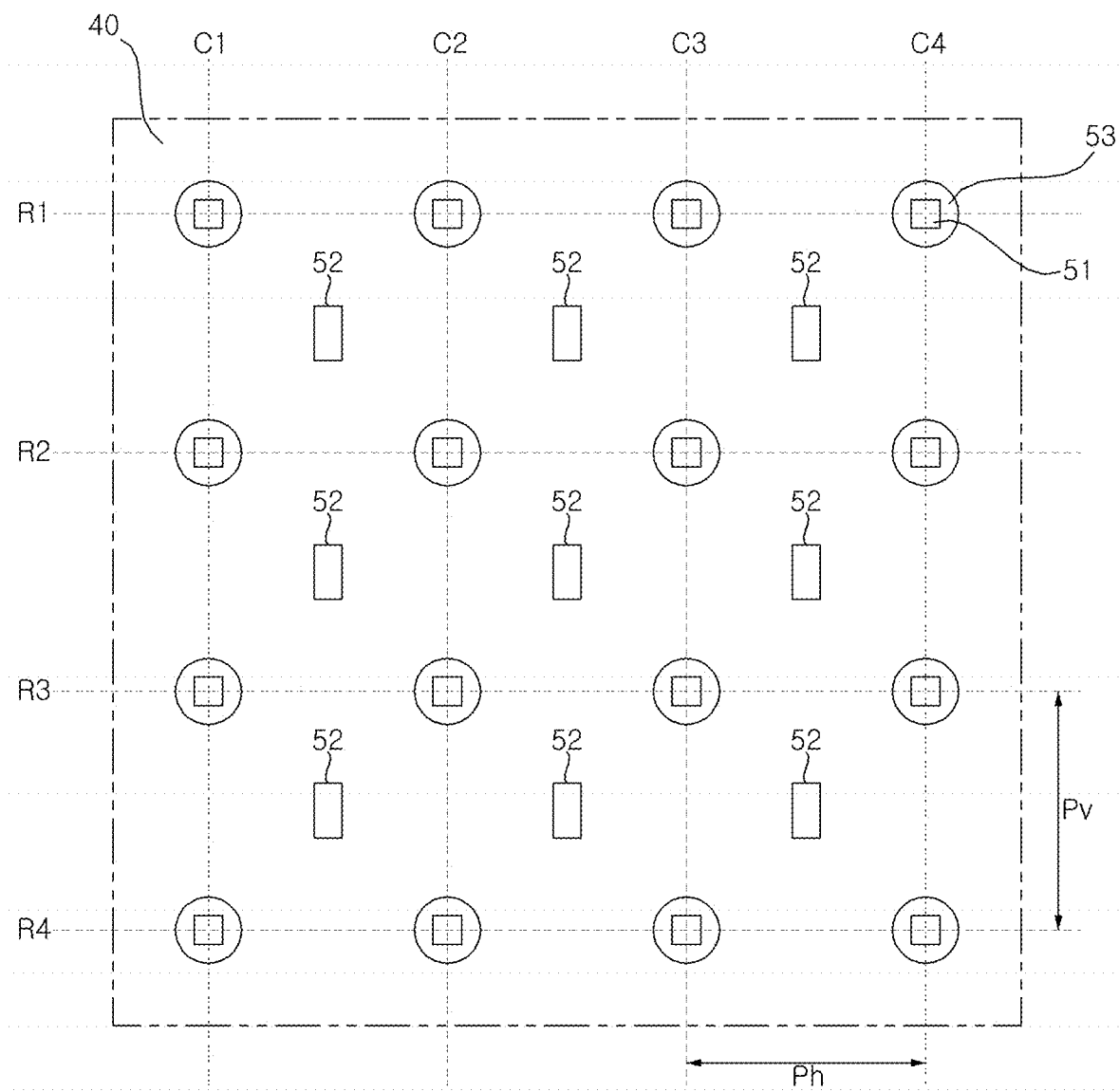

Referring to FIG. 18, a plurality of diodes 52 can be disposed alternately with rows R1, R2, R3, and R4 of light sources 51 while being disposed alternatively with columns C1, C2, C3, and C4 of the light sources 51. That is, a matrix including a plurality of diodes 52 can be diagonally offset (i.e., shifted) from a matrix consisting of a plurality of light sources 51.

Figure 19:
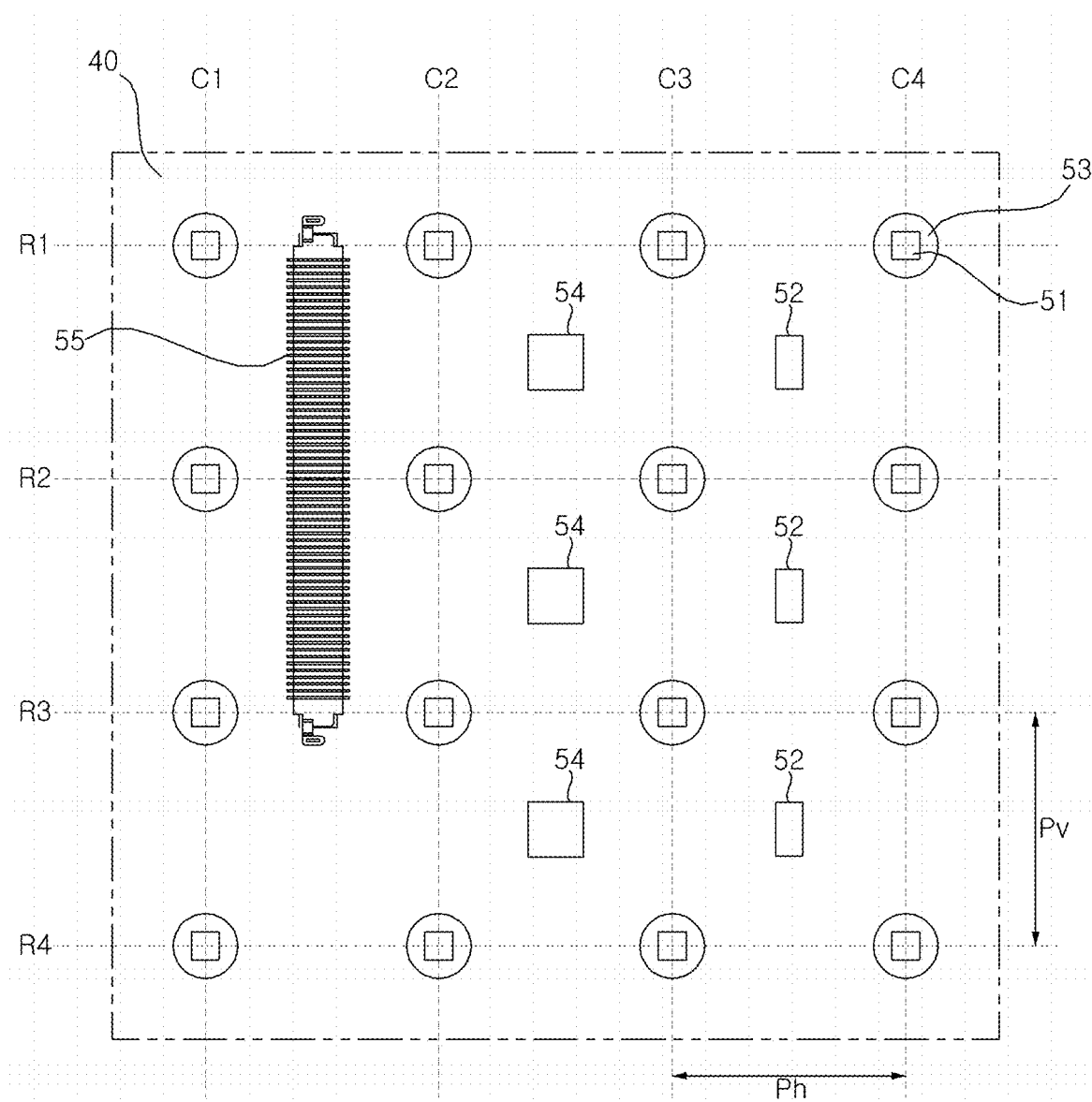

Referring to FIG. 19, a jumper 54 can be mounted on the front surface of the substrate 40. In particular, the jumper 54 can connect wires on the substrate 40. Similar to the diode 52, the jumper 54 can be spaced apart from light sources 51, and can be disposed to be offset from rows R1, R2, R3, and R4 and columns C1, C2, C3, and C4 of the light sources 51.

As shown in FIG. 19, a connector 55 can be mounted on the front surface of the substrate 40. Thus, an LED driver mounted on the frame 40 (see FIG. 2) can be electrically connected to a power supply board and a main board via a cable, and can provide power and current to the light sources 51 on the substrate 40. The connector 55 can also be disposed between the columns (C1, C2, C3, C4) of the light sources 51. Further, the connector 55 can have a length greater than a vertical pitch Pv between the light sources 51. For example, the length of the connector 55 can be approximately twice the vertical pitch Pv. Also, the connector 55 can have a width less than a horizontal pitch Ph between the light sources 51.

In addition, a height of the diode 52 protruding forward from the front surface of the substrate 40 can be greater than a height of the jumper 54 protruding forward from the front surface of the substrate 40. Also, the height of the diode 52 protruding forward from the front surface of the substrate 40 can be greater than a height of the connector 55 protruding forward from the front surface of the substrate 40. In order to minimize the reflective sheet 60 (see FIGS. 9 and 10) that covers the substrate 40 from being lifted around the connector 55, which occupies a relatively large area on the substrate 40, the diode 52 can be disposed outside the periphery of the connector 55. At least two columns (or at least two rows) of the light sources 51 can be located between the connector 55 and the diode 52. For example, the connector 55 can be located between the first column C1 and the second column C2, and the diode(s) 52 can be located between the third column C3 and the fourth column C4. In addition, the jumper(s) 54 can be located between the second column C2 and the third column C3.

Figure 20:
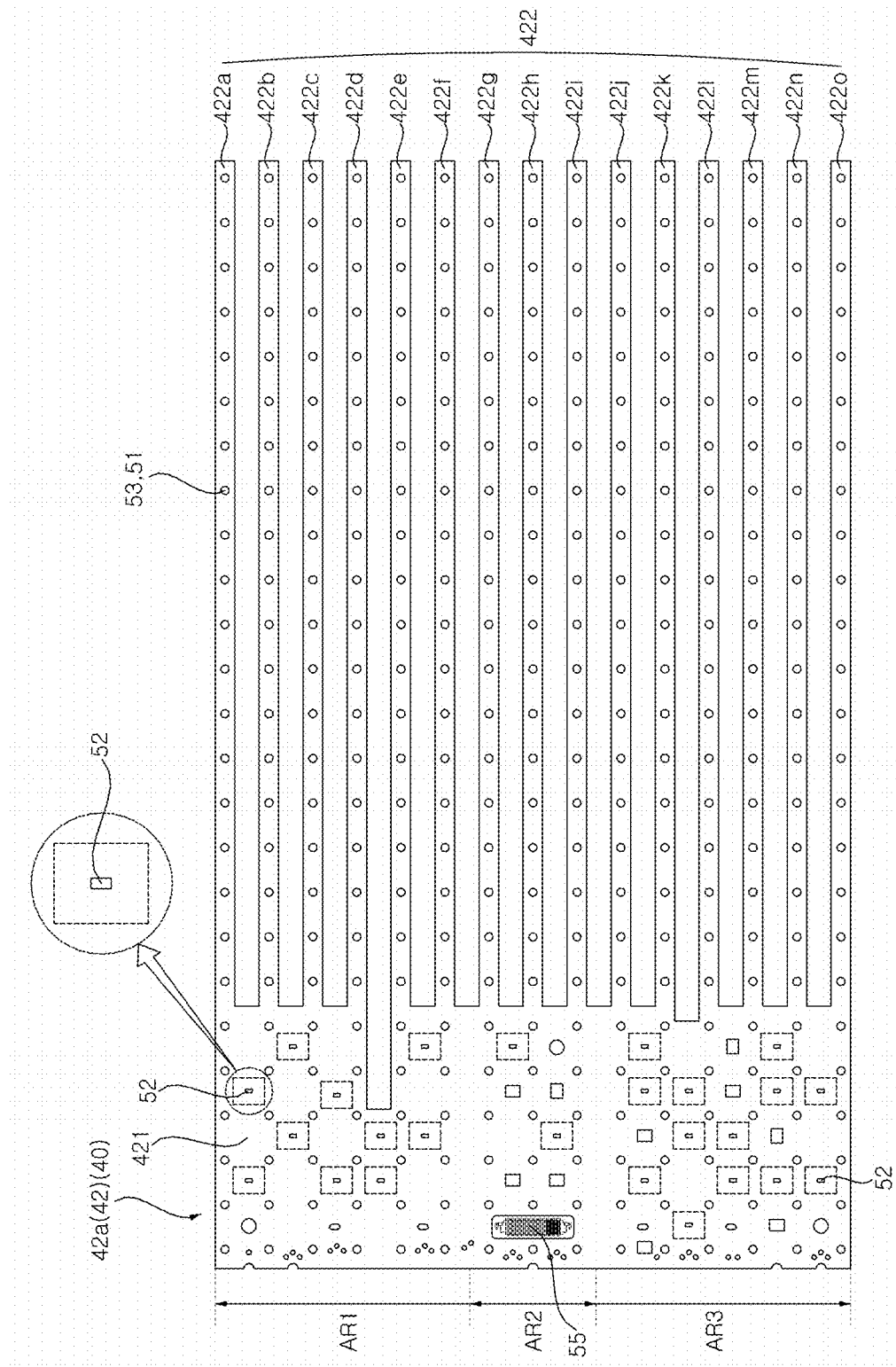

Referring to FIG. 20, the density of diodes 52 can vary depending on the position (or area) of the substrate 40. In particular, the density of diodes 52 around the connector 55 can be relatively low. For examples, the diodes 52 can be positioned on the body 421 of the substrate 42, and the body 421 can include a first area AR1, a second area AR2, and a third area AR3. The connector 55 can be positioned on the second area AR2, and the diodes 52 can be clustered in the first area AR1 and the third area AR3. The second area AR2 can be a central area of the body 421.

Accordingly, the reflective sheet 60 that covers the substrate 40 (see FIGS. 9 and 10) can be minimized from being lifted by the diode 52 around the connector 55, which occupies a relatively large area of the substrate 40. Further, the jumpers 54 with a lower protruding height relative to the diode 52 can be positioned on the second area AR2 on which the connector 55 is located.

Figure 21:
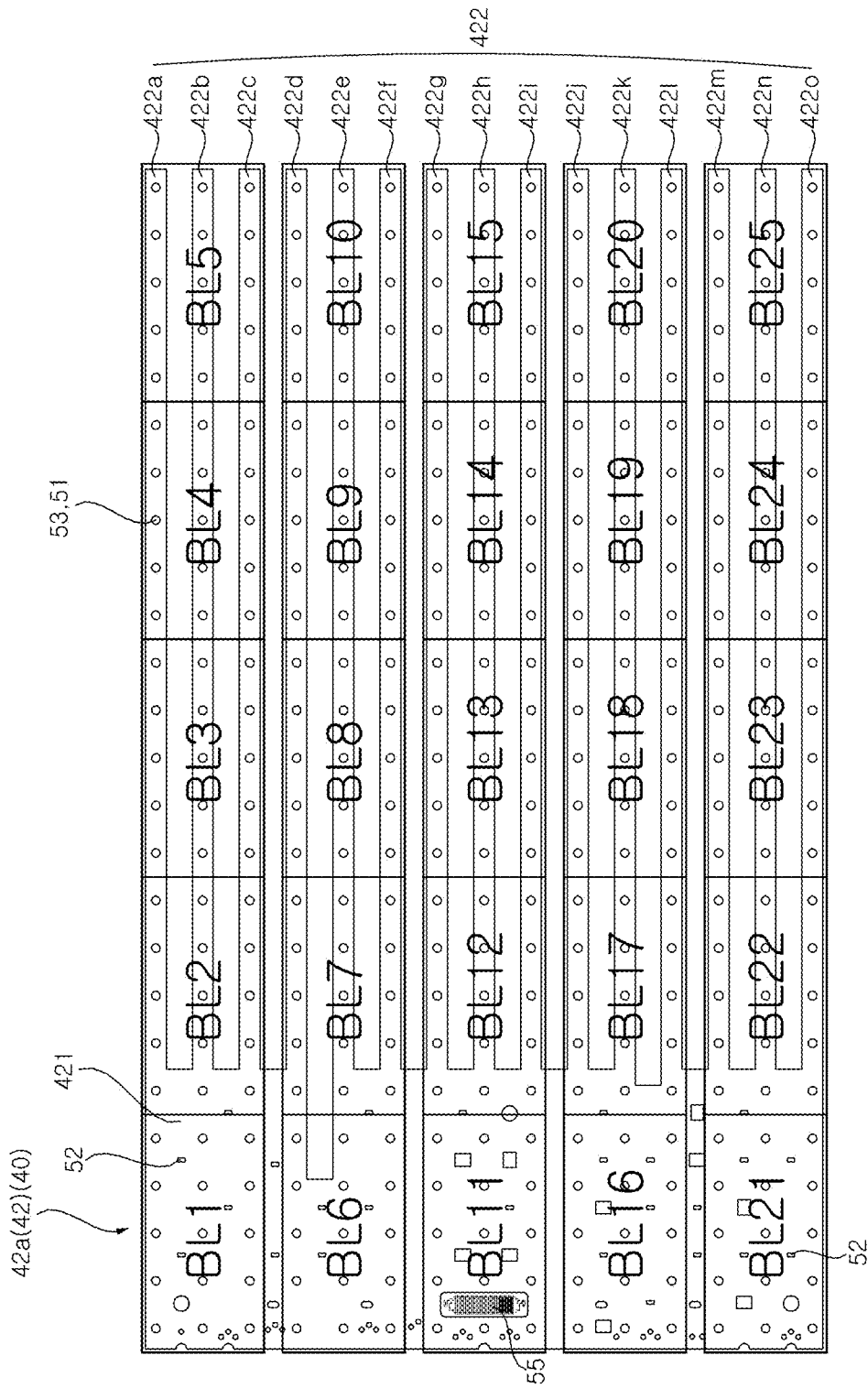
Figure 22:
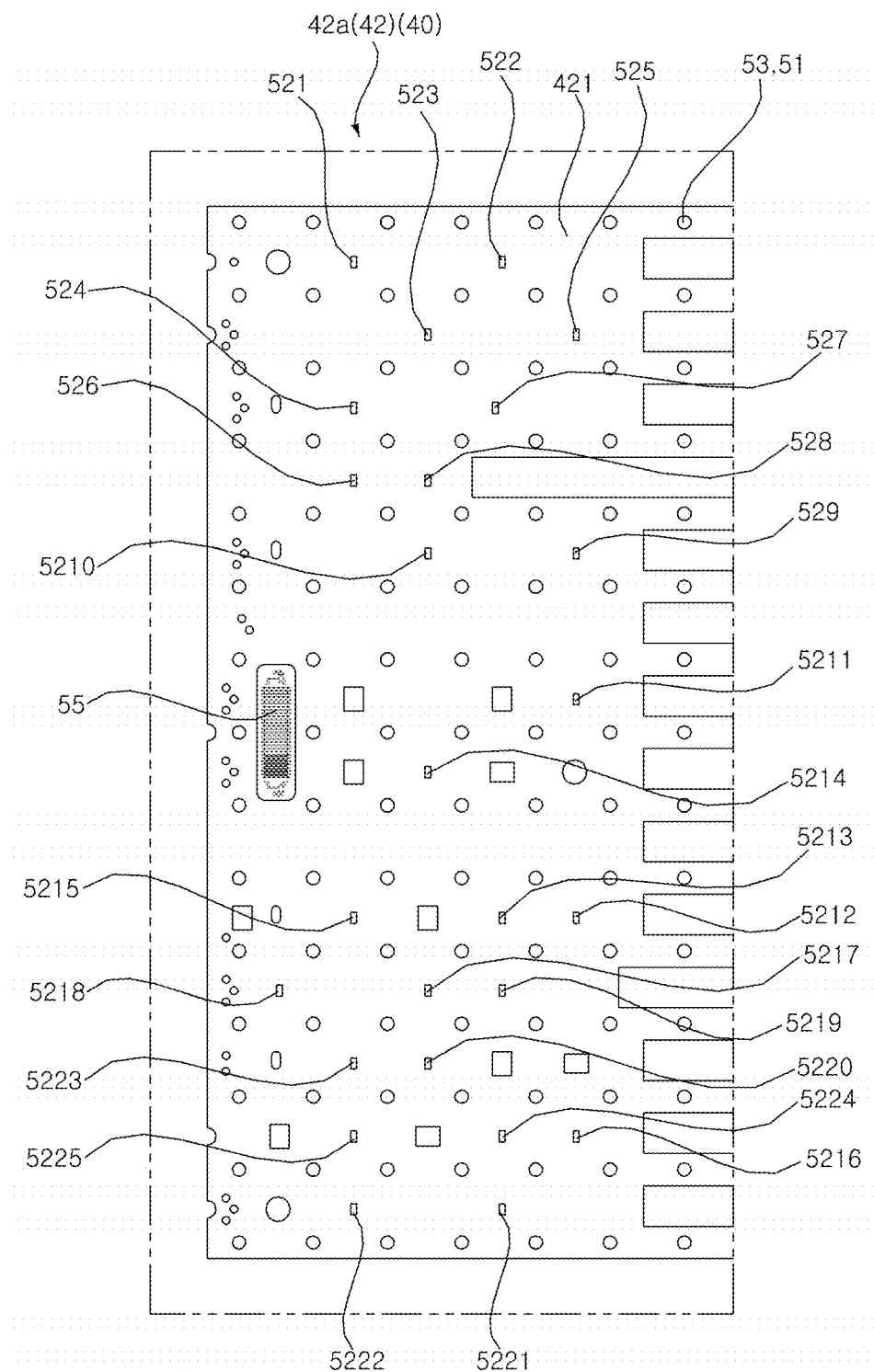

Referring to FIGS. 21 and 22, the light sources 51 on the substrate 40 can be grouped into a plurality of local dimming blocks BLs. One side (or a first side) of each of the plurality of diodes 52 can be electrically connected to a power line of each of the plurality of local dimming blocks, and the other side (or a second side) of each of the plurality of diodes 52 can be electrically connected to a feedback line of each of the plurality of local dimming blocks. Power can be supplied to the local dimming block from the connector 55 via the power line, and a current that has passed through the local dimming block can flow to an LED driver (not shown) via the feedback line and the connector 55. The LED driver can control the brightness of the light sources 51 belonging to the local dimming block by regulating the amount of current flowing through the local dimming block or blocking the flow of current, thereby achieving local dimming.

The diodes 52 can be provided in a number corresponding to the number of local dimming blocks BLs. First to 25th diodes 521, 522, 523, 524, 525, 526, 527, 528, 529, 5210, 5211, 5212, 5213, 5214, 5215, 5216, 5217, 5218, 5219, 5220, 5221, 5222, 5223, 5224, and 5225 can be respectively electrically connected to 1st to 25th local dimming blocks BL1, BL2, BL3, BL4, BL5, BL6, BL7, BL8, BL9, BL10, BL11, BL12, BL13, BL14, BL15, BL16, BL17, BL18, BL19, BL20, BL21, BL22, BL23, BL24, and BL25. The plurality of local dimming blocks BLs can be sequentially arranged from top to bottom or bottom to top. Thus, a circuit pattern design can be facilitated, and the number of jumpers can be reduced.

Figure 23:
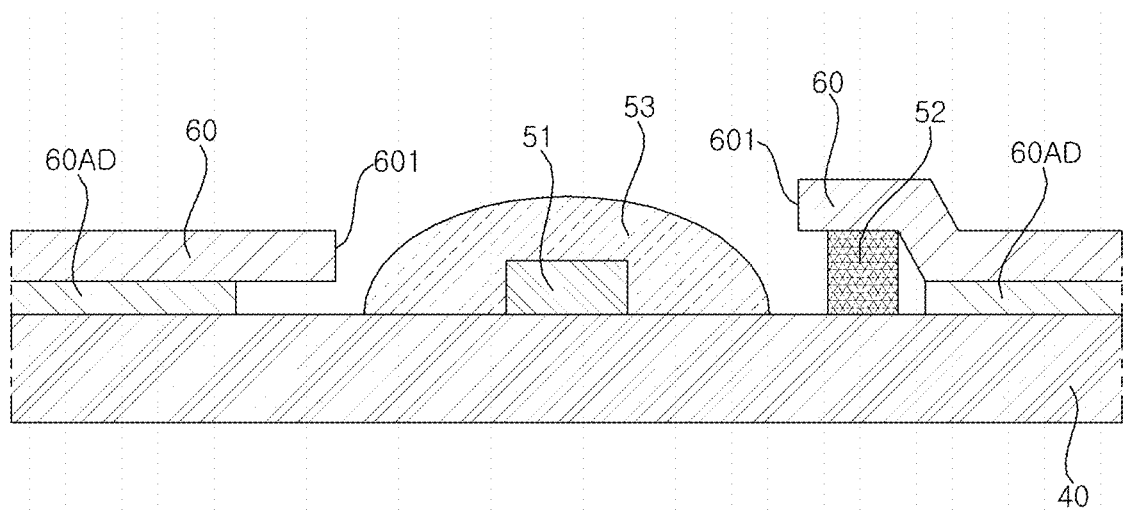

Referring to FIG. 23, the reflective sheet 60 can be attached to the front surface of the substrate 40 by an adhesive member 60AD such as a double-sided tape, and can cover the substrate 40 by avoiding the light source 51 and the lens 53. The lens 53 can be disposed in the hole 601 of the reflective sheet 60, and the reflective sheet 60 can cover the diode 52 that is fixed on the front surface of the substrate 40. A portion of the reflective sheet 60 that covers the diode 52 can also protrude forward relative to the other or remaining portion of the reflective sheet 60.

Figure 24:
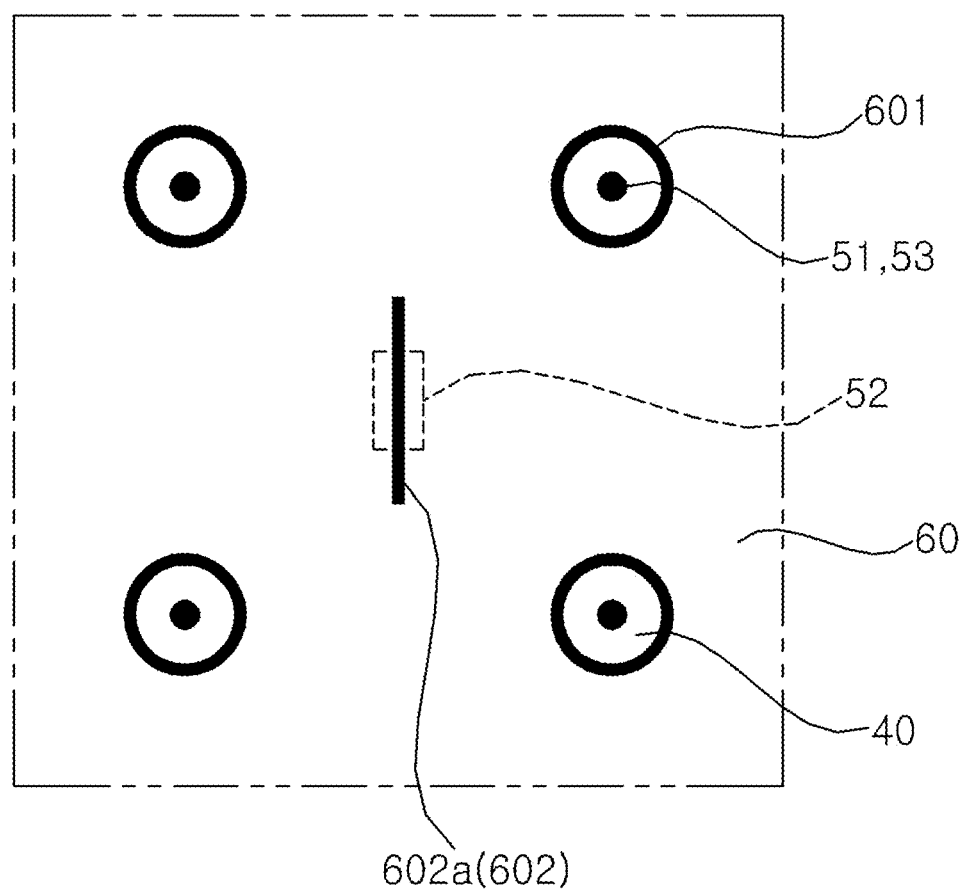

Referring to FIG. 24, a cut line 602a can be formed in a portion of the reflective sheet 50 that covers the diode 52. In particular, the cut line 602a can be elongated in a longitudinal direction of the diode 52. The cut line 602a can also be parallel to a longitudinal axis of the diode 52, and a length of the cut line 602a can be greater than a length of the diode 52. The diode 52 can have a cross section of a vertically long rectangular shape, and the cut line 602a can be referred to as a vertical cut line 602a.

Accordingly, the cut line 602a can be spread apart by the diode 52, and thus, the portion of the reflective sheet 60 that covers the diode 52 can be moved closer to the substrate 40. That is, a distance between the portion of the reflective sheet 60 covering the diode 52 and the diffusion plate 31 (see FIG.

2) can become close or similar to a distance between the remaining portion of the reflective sheet 60 and the diffusion plate 31, thereby improving the light uniformity. In addition, as the reflective sheet 60 becomes adjacent to the substrate 40, the separation of the reflective sheet 60 from the substrate 40 can be suppressed.

Figure 25:
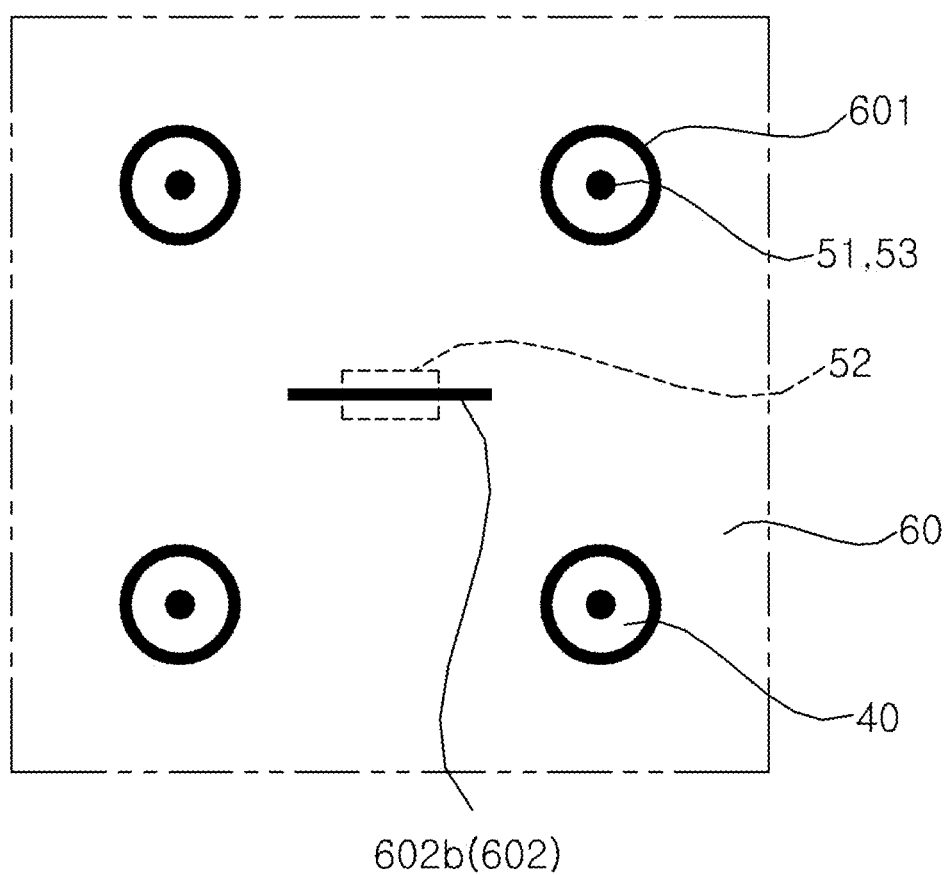

Referring to FIG. 25, a cut line 602b can also be formed in a portion of the reflective sheet 60 that covers the diode 52. As shown, the cutting line 602b can be elongated in a longitudinal direction of the diode 52. The cut line 602b can also be parallel to a longitudinal axis of the diode 52, and a length of the cut line 602b can be greater than a length of the diode 52. The diode 52 can have a cross section of a horizontally long rectangular shape, and the cut line 602b can be referred to as a horizontal cut line 602b.

Accordingly, the cut line 602b can be spread apart by the diode 52, and thus, the portion of the reflective sheet 60 that covers the diode 52 can be moved closer to the substrate 40. That is, a distance between the portion of the reflective sheet 60 covering the diode 52 and the diffusion plate 31 (see FIG. 2) can become close or similar to a distance between the remaining portion of the reflective sheet 60 and the diffusion plate 31, thereby improving the light uniformity. In addition, as the reflective sheet 60 becomes adjacent to the substrate 40, the separation of the reflective sheet 60 from the substrate 40 can be suppressed.

Figure 26:
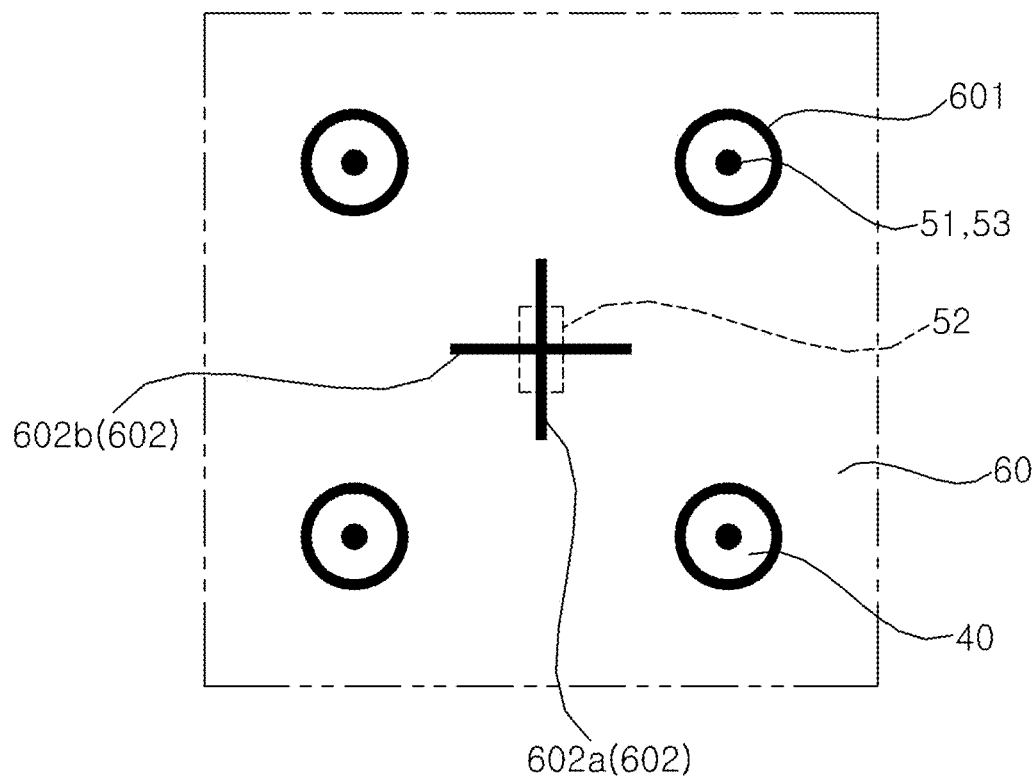

Referring to FIG. 26, a cut line 602c can be formed in a portion of the reflective sheet 60 that covers the diode 52. The cut line 602c can have a "+" shape. In particular, the cut line 602c can include a cut line 602a and a cut line 602b. The cut line 602a can be referred to as a first part of the cut line 602c, and the cut line 602b can be referred to as a second part of the cut line 602c. When the diode 52 has a cross section of a vertically long rectangular shape, a length of the first part 602a can be greater than a length of the cross section, and a length of the second part 602b can be greater than a width of the cross section. When the diode 52 has a cross section of a horizontally long rectangular shape, a length of the second part 602b can be greater than a length of the cross section, and a length of the first part 602a can be greater than a width of the cross section.

Accordingly, the cut line 602c can be easily spread apart by the diode 52, and thus, the portion of the reflective sheet 60 that covers the diode 52 can be moved more closer to the substrate 40. That is, a distance between the portion of the reflective sheet 60 covering the diode 52 and the diffusion plate 31 (see FIG. 2) can become closer or more similar to a distance between the remaining portion of the reflective sheet 60 and the diffusion plate 31, thereby further improving the light uniformity. In addition, as the reflective sheet 60 becomes more adjacent to the substrate 40, the separation of the reflective sheet 60 from the substrate 40 can be further suppressed.

Figure 27:
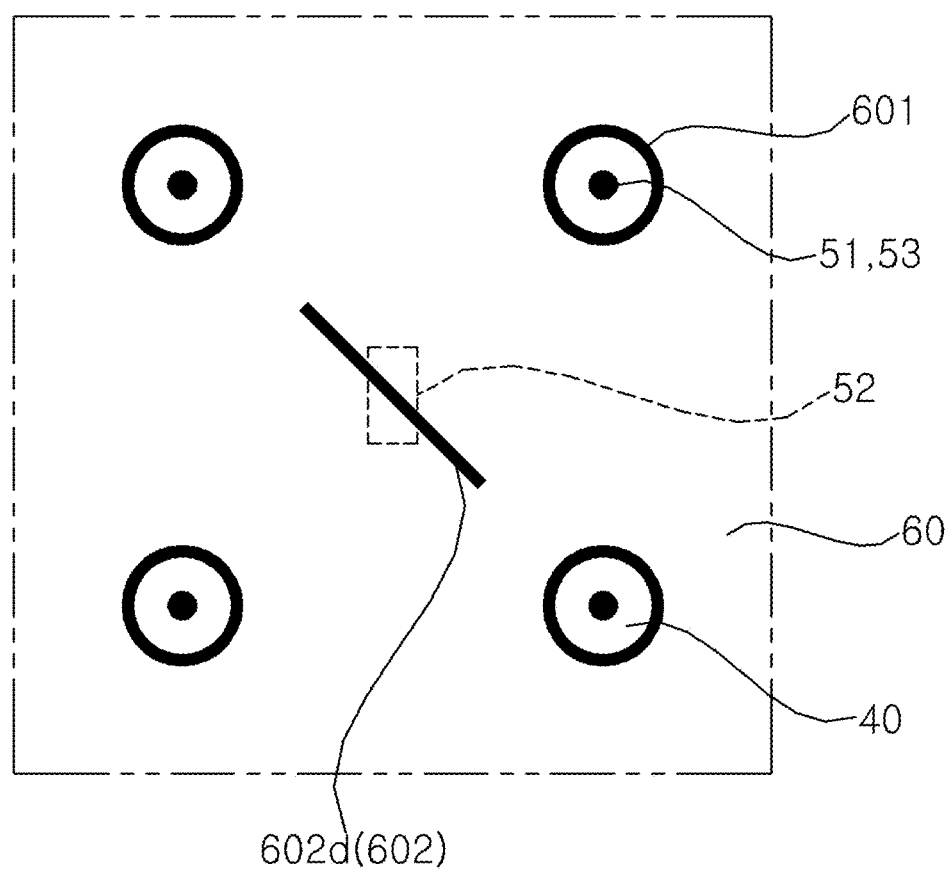

Referring to FIG. 27, a cut line 602d can be formed in a portion of the reflective sheet 60 that covers the diode 52. In particular, the cut line 602d can be elongated in a direction inclined from a longitudinal axis of the diode 52 to a first direction. A length of the cut line 602d can be greater than a length of the diode 52. The diode 52 can have a cross section of a vertically or horizontally long rectangular shape, and the cut line 602d can be referred to as a first diagonal cut line 602d.

Accordingly, the cut line 602d can be spread apart by the diode 52, and thus, the portion of the reflective sheet 60 that covers the diode 52 can be moved closer to the substrate 40. That is, a distance between the portion of the reflective sheet 60 covering the diode 52 and the diffusion plate 31 (see FIG. 2) can become close or similar to a distance between the remaining portion of the reflective sheet 60 and the diffusion plate 31, thereby improving the light uniformity. In addition, as the reflective sheet 60 becomes adjacent to the substrate 40, the separation of the reflective sheet 60 from the substrate 40 can be suppressed.

Figure 28:
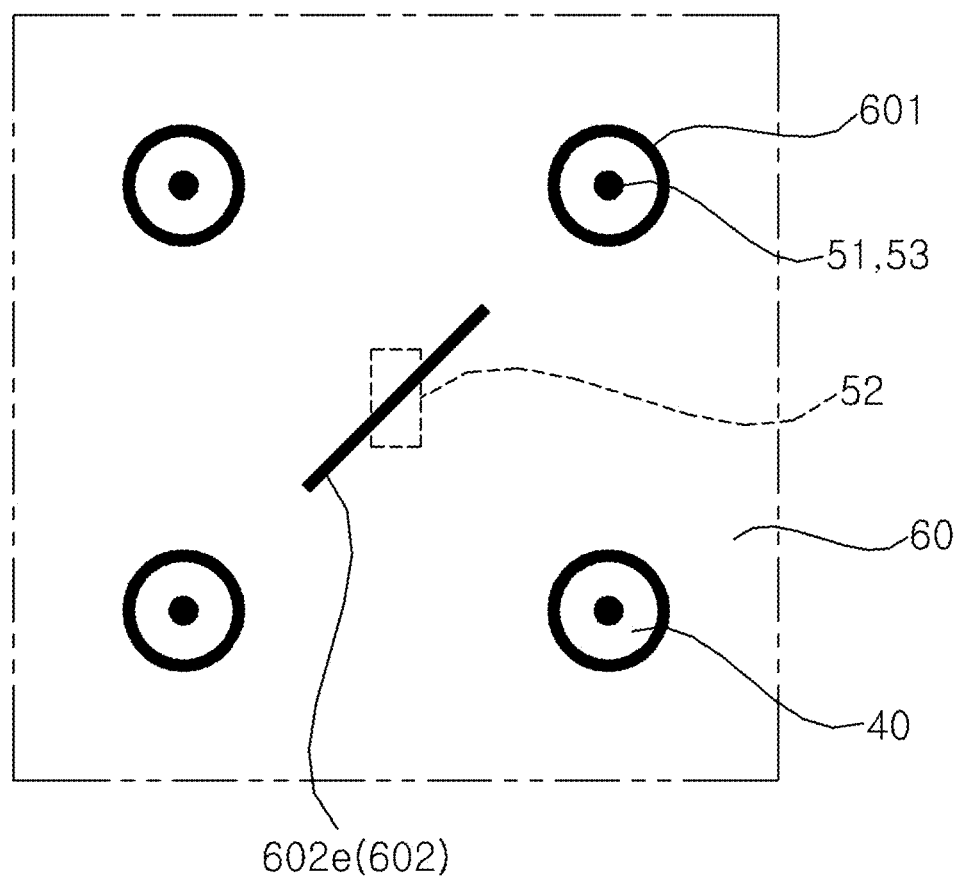

Referring to FIG. 28, a cut line 602e can be formed in a portion of the reflective sheet 60 that covers the diode 52. In particular, the cut line 602e can be elongated in a direction inclined from a longitudinal axis of the diode 52 to a second direction. A length of the cut line 602e can be greater than a length of the diode 52. The diode 52 can have a cross section of a vertically or horizontally long rectangular shape, and the cut line 602e can be referred to as a second diagonal cut line 602c.

Accordingly, the cut line 602e can be spread apart by the diode 52, and thus, the portion of the reflective sheet 60 that covers the diode 52 can be moved closer to the substrate 40. That is, a distance between the portion of the reflective sheet 60 covering the diode 52 and the diffusion plate 31 (see FIG. 2) can become close or similar to a distance between the remaining portion of the reflective sheet 60 and the diffusion plate 31, thereby improving the light uniformity. In addition, as the reflective sheet 60 becomes adjacent to the substrate 40, the separation of the reflective sheet 60 from the substrate 40 can be suppressed.

Figure 29:
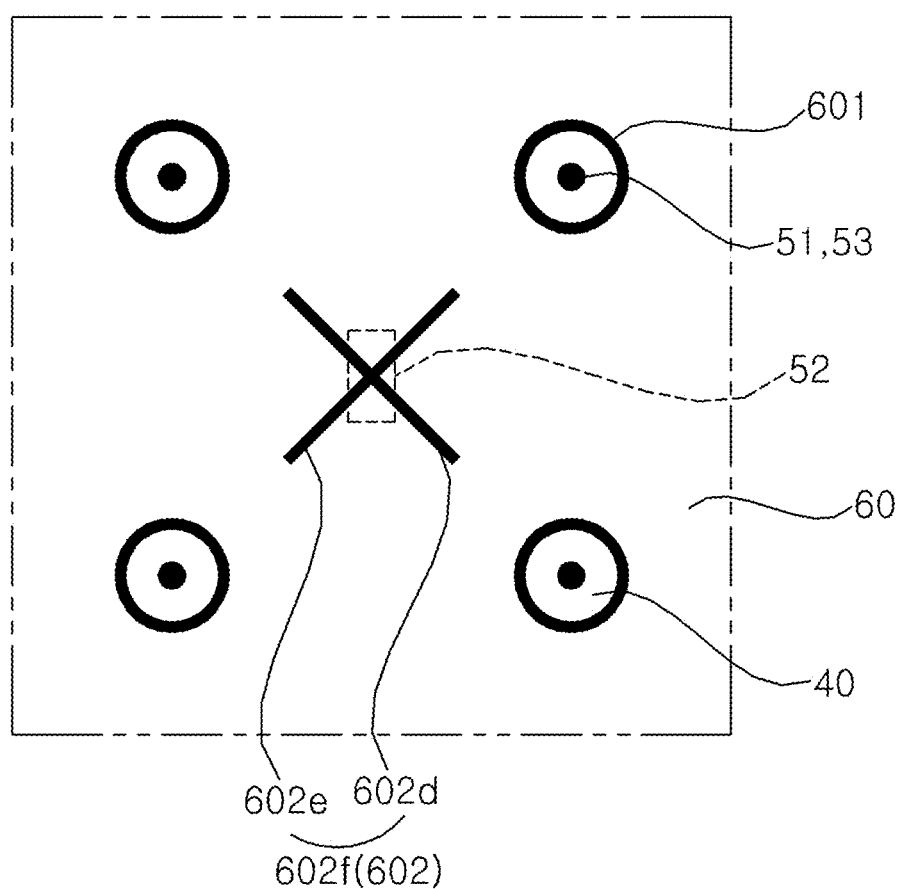

Referring to FIG. 29, a cut line 602f can be formed in a portion of the reflective sheet 60 that covers the diode 52. In particular, the cut line 602f can have an "x" shape and include a cut line 602d and a cut line 602e. The cut line 602d can be referred to as a first part 602d of the cut line 602f, and the cut line 602e can be referred to as a second part 602e of the cut line 602f. The diode 52 can have a cross section of a vertically or horizontally long rectangular shape, and the first and second parts 602d and 602e can have a length greater than a length of the diode 52.

Accordingly, the cut line 602f can be easily spread apart by the diode 52, and thus, the portion of the reflective sheet 60 that covers the reflective sheet 60 can be moved more closer to the substrate 40. That is, a distance between the portion of the reflective sheet 60 covering the diode 52 and the diffusion plate 31 (see FIG. 2) can be closer or more similar to a distance between the remaining portion of the reflective sheet 60 and the diffusion plate 31, thereby further improving the light uniformity. In addition, as the reflective sheet 60 becomes more adjacent to the substrate 40, the separation of the reflective sheet 60 from the substrate 40 can be further suppressed.

Figure 30:
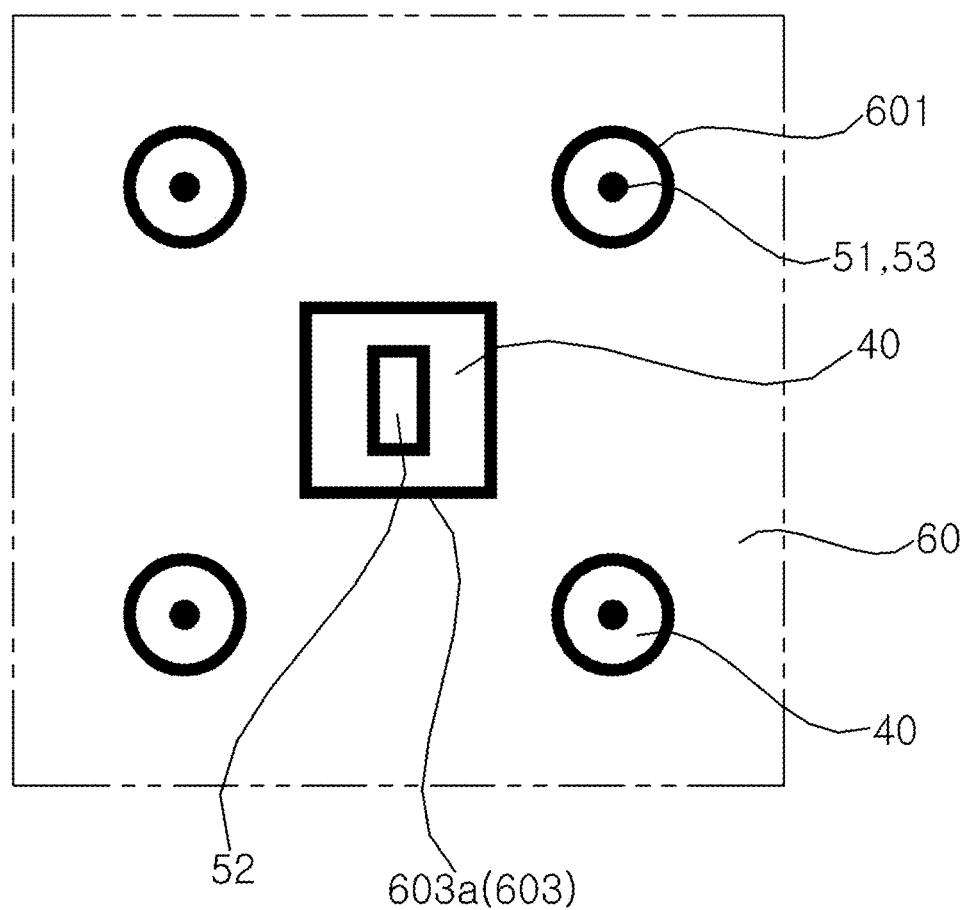

Referring to FIG. 30, a through-hole 603a can be formed in a portion of the reflective sheet 60 that faces the diode 52. The through-hole 603a can have a polygonal shape such as a square or triangle. The diode 52 can be disposed in the through-hole 603a, and can be exposed to the front. Here, the through-hole 603a can have a size greater than the diode 52, or can have a size less than or equal to the diode 52.

A front surface of the diode 52 (or front and side surfaces of the diode 52) can be coated with a reflective material (e.g., a white material). In addition, the front surface of the substrate 40 can also be coated with a reflective material (e.g., a white material). The reflective material coated on the diode 52 and the substrate 40 can have a reflectance similar to that of the reflective sheet 60.

Accordingly, a portion of the reflective sheet 60 around the diode 52 can come into close contact with the substrate 40, and thus, the portion of the reflective sheet 60 around the diode 52 and the diffusion plate 31 (FIG. 2) can be the same as a distance between the reaming portion of the reflective sheet 60 and the diffusion plate 31, allowing the light uniformity to be greatly improved. In addition, a decrease in light reflectance (i.e., the formation of dark portions or regions), caused by the diode 52, between the reflection sheet 60 and the diffusion plate 31 can be minimized. Further, as the reflective sheet 60 is in close contact with the substrate 40, the separation of the reflective sheet 60 from the substrate 40 can be suppressed.

Figure 31:
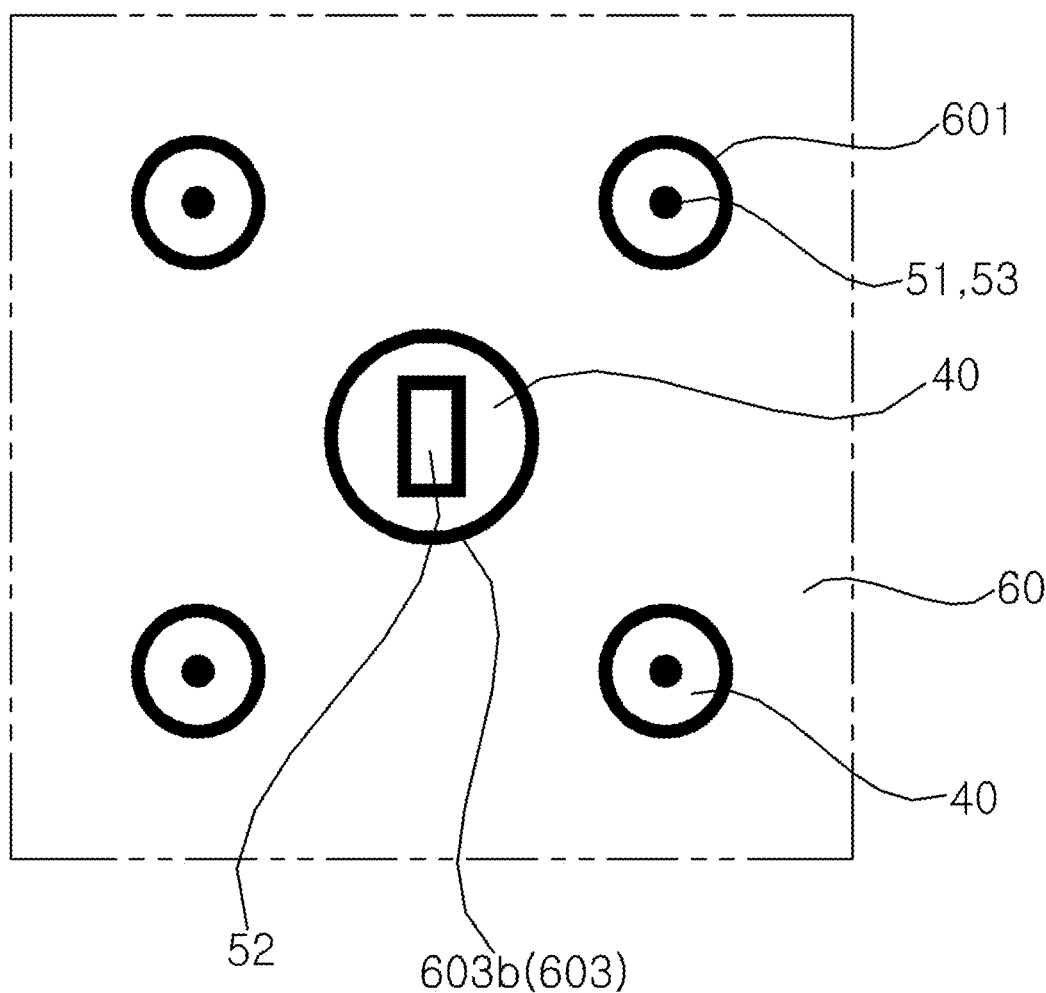

Referring to FIG. 31, a through-hole 603b can be formed in a portion of the reflective sheet 60 that faces the diode 52. In particular, the through-hole 603b can have the shape of a circle or an oval. The diode 52 can be disposed in the through-hole 603b, and can be exposed to the front. Here, the through-hole 603b can have a size greater than the diode 52, or can have a size less than or equal to the diode 52.

A front surface of the diode 52 (or front and side surfaces of the diode 52) can be coated with a reflective material (e.g., a white material). In addition, the front surface of the substrate 40 can also be coated with a reflective material (e.g., a white material). The reflective material coated on the diode 52 and the substrate 40 can have a reflectance similar to that of the reflective sheet 60.

Accordingly, a portion of the reflective sheet 60 around the diode 52 can come into close contact with the substrate 40, and thus, the portion of the reflective sheet 60 around the diode 52 and the diffusion plate 31 (FIG. 2) can be the same as a distance between the remaining portion of the reflective sheet 60 and the diffusion plate 31, allowing the light uniformity to be greatly improved. In addition, a decrease in light reflectance (i.e., the formation of dark portions or regions), caused by the diode 52, between the reflection sheet 60 and the diffusion plate 31 can be minimized. Further, as the reflective sheet 60 is in close contact with the substrate 40, the separation of the reflective sheet 60 from the substrate 40 can be suppressed.

Referring back to FIGS. 24 to 31, the cut line 602 and the through-hole 603 can be positioned to correspond to the diode 52. That is, similar to the diode 52, the cut line 602 and the through-hole 603 can be disposed obliquely to the rows and columns of the light sources 51. Here, a distance between a boundary of the cut line 602 or the through-hole 603 and a boundary of the hole 601 can be relatively large. Accordingly, even when the cut line 602 and the through-hole 603 are spread apart by the diode 52, the reflective sheet 60 is not torn or ripped.

By contrast, as described above, when a diode, a cut line, and a through-hole are arranged side by side with the rows or columns of the light sources 51, a distance between a boundary of the cut line or the through-hole and a boundary of the hole 601 can be relatively small. When these cut line and the through-hole are spread apart by the diode, the reflective sheet 60 can be torn or ripped.

Referring to FIGS. 1 to 31, a display device according to an aspect of the present disclosure includes a display panel; a frame positioned behind the display panel; a substrate positioned between the display panel and the frame, and coupled to the frame; a plurality of light sources arranged on a front surface of the substrate; and a protruding element positioned on the front surface of the substrate, and protruding from the front surface of the substrate toward the display panel. The protruding element can be positioned alternately to rows and columns of the light sources. The substrate can be a single sided PCB. The protruding element can be a Zener diode.

The plurality of light sources can includes a first light source positioned in a first column of a first row; a second light source positioned in a second column of the first row; a third light source positioned in the first column of a second row; and a fourth light source positioned in the second column of the second row. The protruding element can be positioned on or adjacent to a straight line that connects the first light source and the fourth light source. The protruding element can be located at a center of the straight line. A distance between the first light source and the protruding element can be greater than a distance from the first light source to a center between the first light source and the third light source.

In addition, the protruding element can include a plurality of protruding elements that are alternatively positioned with the rows of the light sources while being alternatively positioned with the columns of the light sources. The display device may further include a reflective sheet covering the front surface of the substrate and including holes at which the light sources are positioned; and a connector positioned on the front surface of the substrate, disposed between the light sources, and covered by the reflective sheet.

With respect to the front surface of the substrate, a protruding height of the protruding element can be greater than a protruding height of the connector. At least two columns of the light sources can be positioned between the connector and the protruding element. With respect to the front surface of the substrate, a protruding height of the protruding element can be greater than a protruding height of the connector. The protruding element can also include a plurality of protruding elements. The substrate can include a first area and a second area at which the connector is positioned. The density of the protruding elements can be relatively higher in the first area than in the second area.

Further, the plurality of light sources can be grouped into a plurality of local dimming blocks. The protruding element can also include a plurality of diodes provided in a number corresponding to the number of the plurality of local dimming blocks, and electrically connected to the plurality of local dimming blocks. The plurality of local dimming blocks can be sequentially arranged from top to bottom or bottom to top of the substrate.

The display device can further include a reflective sheet covering the front surface of the substrate and the protruding element, and including a plurality of holes in which the plurality of light sources are positioned. The reflective sheet can include a cut line formed in a portion of the reflective sheet that covers the protruding element. Also, the protruding element can have a cross section of a rectangular shape. Further, the cut line can include a first part which is parallel to a longitudinal axis of the protruding element and which has a length greater than a length of the protruding element.

In addition, a cut line can include a second part which intersects the longitudinal axis of the protruding element and which has a length greater than a width of the protruding element. The display device can further include a reflective sheet covering the front surface of the substrate and including a plurality of holes in which the plurality of light sources are disposed. Further, the protruding element can pass through the reflective sheet and have a front surface coated with a reflective material.

A display device according to the present disclosure has the following effects. First, it is possible to provide a display device having a single sided PCB as a substrate on which light sources are mounted. Second, it is possible to provide a structure that improves the picture quality by minimizing intrusion in the light coverage of light sources on a substrate by a protruding element on the substrate. Third, it is possible to provide various examples of the placement of a protruding element between light sources.

That is, the present disclosure provides a structure that minimizes a reflective sheet, which covers a substrate, from being lifted by a protruding element on a substrate. Therefore, it is possible to provide various examples of a structure for allowing a reflective sheet on a protruding element to be adjacent to a substrate.

Certain embodiments or other embodiments of the disclosure described above are not mutually exclusive or distinct from each other. Any or all elements of the embodiments of the disclosure described above may be combined or combined with each other in configuration or function. For example, a configuration "A" described in one embodiment of the disclosure and/or the drawings, and a configuration "B" described in another embodiment of the disclosure and/or the drawings may be combined with each other. Namely, although the combination between the configurations is not directly described, the combination is possible except in the case where it is described that the combination is impossible.

The above detailed description is to be construed in all aspects as illustrative and not restrictive. The scope of the disclosure should be determined by reasonable interpretation of the appended claims, and all changes coming within the equivalency range of the disclosure are intended to be embraced in the scope of the disclosure.

What is claimed is:

1. A display device comprising:
   a display panel;
   a frame positioned behind the display panel;
   a substrate positioned between the display panel and the frame, and coupled to the frame;
   a plurality of light sources arranged in a matrix including aligned rows and columns of light sources on a front surface of the substrate; and
   a diode positioned on the front surface of the substrate to be offset from a corresponding column and a corresponding row of the light sources,
   wherein the plurality of light sources are grouped into a plurality of local dimming blocks,
   wherein the diode comprises a plurality of diodes provided in a number corresponding to a number of the plurality of local dimming blocks and electrically connected to the plurality of local dimming blocks, and
   wherein the plurality of local dimming blocks are sequentially arranged from top to bottom or bottom to top of the substrate.

2. The display device of claim 1, wherein the plurality of light sources comprises:
   a first light source positioned in a first column of a first row;
   a second light source positioned in a second column of the first row;
   a third light source positioned in the first column of a second row; and
   a fourth light source positioned in the second column of the second row, and
   wherein the diode is positioned on or adjacent to a straight line connecting the first light source and the fourth light source.

3. The display device of claim 2, wherein the diode is located at a center of the straight line.

4. The display device of claim 2, wherein a distance between the first light source and the diode is greater than a distance from the first light source to a center between the first light source and the third light source.

5. The display device of claim 1, further comprising:
   a reflective sheet covering the front surface of the substrate and including holes at which the light sources are positioned; and
   a connector positioned on the front surface of the substrate, disposed between the light sources, and covered by the reflective sheet.

6. The display device of claim 5, wherein the diode protrudes higher than a protruding height of the connector, and
   wherein at least two columns of the light sources are positioned between the connector and the diode.

7. The display device of claim 5, wherein the diode protrudes higher than a protruding height of the connector, wherein the substrate comprises:
   a first area; and
   a second area at which the connector is positioned, and
   wherein a density of the diodes is higher in the first area than in the second area.

8. The display device of claim 1, wherein a single diode is positioned between four adjacent light sources included in the matrix of the light sources.

9. The display device of claim 8, wherein the single diode is positioned on a first diagonal line connecting first and third light sources among the four adjacent light sources, and a second diagonal line connecting second and fourth light sources among the four adjacent light sources.

10. The display device of claim 1, wherein the substrate is a single sided PCB.

11. The display device of claim 1, wherein the diode is a Zener diode.

12. The display device of claim 1, wherein the plurality of diodes are alternatively positioned with the rows of the light sources while being alternatively positioned with the columns of the light sources.

13. The display device of claim 1, further comprising:
    a reflective sheet covering the front surface of the substrate and the diode, and including a plurality of holes in which the plurality of light sources are positioned,
    wherein the reflective sheet comprises a cut line formed in a portion of the reflective sheet that covers the diode.

14. The display device of claim 1, wherein a matrix of the plurality of diodes is diagonally offset from the matrix including the plurality of light sources.

15. The display device of claim 1, wherein the diode is positioned to be offset from any straight line connecting adjacent light sources.

16. A display device comprising:
    a display panel;
    a frame positioned behind the display panel;
    a substrate positioned between the display panel and the frame, and coupled to the frame;
    a plurality of light sources arranged in a matrix including aligned rows and columns of light sources on a front surface of the substrate;
    a diode positioned on the front surface of the substrate to be offset from a corresponding column and a corresponding row of the light sources;
    a reflective sheet covering the front surface of the substrate and the diode, and including a plurality of holes in which the plurality of light sources are positioned,
    wherein the reflective sheet comprises a cut line formed in a portion of the reflective sheet that covers the diode,
    wherein the diode has a cross section of a rectangular shape, and
    wherein the cut line comprises a first part parallel to a longitudinal axis of the diode and having a length greater than a length of the diode.

17. The display device of claim 16, wherein the cut line comprises a second part intersecting the longitudinal axis of the diode and having a length greater than a width of the diode.

18. A display device comprising:
- a display panel;
- a frame positioned behind the display panel;
- a substrate positioned between the display panel and the frame, and coupled to the frame;
- a plurality of light sources arranged in a matrix including aligned rows and columns of light sources on a front surface of the substrate;
- a diode positioned on the front surface of the substrate to be offset from a corresponding column and a corresponding row of the light sources; and
- a reflective sheet covering the front surface of the substrate and including a plurality of holes in which the plurality of light sources are disposed,
- wherein the diode passes through the reflective sheet and has a front surface coated with a reflective material.

* * * * *